(12) United States Patent
Chu et al.

(10) Patent No.: US 7,903,532 B2
(45) Date of Patent: Mar. 8, 2011

(54) ELEVATED ELECTRODES FOR PROBE POSITION SENSING

(75) Inventors: Patrick Breckow Chu, Wexford, PA (US); Mark David Bedillion, Allison Park, PA (US); Earl Chrzaszcz Johns, Sewickley, PA (US); Mark Ian Lutwyche, Reisterstown, MD (US)

(73) Assignee: Seagate Technology LLC, Scotts Valley, CA (US)

( * ) Notice: Subject to any disclaimer, the term of this patent is extended or adjusted under 35 U.S.C. 154(b) by 1183 days.

(21) Appl. No.: 11/545,896

(22) Filed: Oct. 11, 2006

(65) Prior Publication Data

US 2008/0089211 A1 Apr. 17, 2008

(51) Int. Cl.
*G11B 9/00* (2006.01)

(52) U.S. Cl. .................................................. 369/126

(58) Field of Classification Search .................. 369/126
See application file for complete search history.

(56) References Cited

U.S. PATENT DOCUMENTS

| | | | |
|---|---|---|---|
| 5,371,728 A * | 12/1994 | Sakai et al. | 369/126 |
| 5,392,275 A * | 2/1995 | Kawada et al. | 250/442.11 |
| 5,396,453 A * | 3/1995 | Kawada et al. | 250/310 |
| 5,418,771 A * | 5/1995 | Kasanuki et al. | 250/310 |
| 5,557,596 A | 9/1996 | Gibson et al. | |
| 5,717,680 A * | 2/1998 | Yamano et al. | 369/126 |
| 5,751,683 A | 5/1998 | Kley | |
| 5,834,864 A | 11/1998 | Hesterman et al. | |
| 5,986,381 A | 11/1999 | Hoen et al. | |
| 6,304,527 B1 * | 10/2001 | Ito et al. | 369/126 |
| 6,465,355 B1 | 10/2002 | Horsley | |
| 6,590,850 B2 | 7/2003 | Eldredge et al. | |
| 6,632,698 B2 | 10/2003 | Ives | |
| 6,647,766 B2 | 11/2003 | Despont et al. | |
| 6,657,444 B2 | 12/2003 | Fasen | |
| 6,724,712 B2 | 4/2004 | Kley | |
| 6,738,336 B2 | 5/2004 | Naberhuis | |
| 6,775,034 B1 | 8/2004 | Morford | |
| 6,784,592 B2 | 8/2004 | Hartwell | |
| 6,784,593 B2 | 8/2004 | Hartwell | |
| 6,784,630 B2 | 8/2004 | Hartwell | |
| 6,882,019 B2 | 4/2005 | Walmsley et al. | |
| 6,925,047 B2 | 8/2005 | Ives | |
| 2003/0206512 A1 | 11/2003 | Ashton | |
| 2003/0218960 A1 | 11/2003 | Albrecht et al. | |
| 2004/0047275 A1 | 3/2004 | Cherubini et al. | |

(Continued)

OTHER PUBLICATIONS

E. Eleftheriou et al., "A Nanotechnology-Based Approach to Data Storage," Proceedings of the 29th VLDB Conference, Berlin, Germany, 2003, 5 pgs.

(Continued)

*Primary Examiner* — Thang V Tran
(74) *Attorney, Agent, or Firm* — Robert P. Lenart, Esq.; Pietragallo Gordon Alfano Bosick & Raspanti, LLP

(57) ABSTRACT

An apparatus comprises a storage medium, a head substrate, wherein the storage medium and the head substrate are separated by a gap, a plurality of electrodes separated from each other, and a support structure positioned in the gap for supporting some of the electrodes. An apparatus comprising a storage medium, a head substrate, wherein the storage medium and the head substrate are separated by a gap, a plurality of posts positioned in the gap, a layer of low friction material positioned on one end of each of the posts, is also described.

18 Claims, 16 Drawing Sheets

U.S. PATENT DOCUMENTS

| | | | |
|---|---|---|---|
| 2005/0094430 A1 | 5/2005 | Nauka et al. | |
| 2005/0128927 A1* | 6/2005 | Milligan et al. | 369/126 |
| 2006/0023606 A1 | 2/2006 | Lutwyche et al. | |

OTHER PUBLICATIONS

H. Yu et al., "Tabular Placement of Relational Data on MEMS-Based Storage Devices," Proceedings of the 29th VLDB Conference, Berlin, Germany, 2003, 14 pgs.

A. Crossley et al., "Tribology of Diamond-Like Carbon Films From Generic Fabrication Routes Investigated by Lateral Force Microscopy", J. Phys. D: Appl. Phys., vol. 31, 1998, pp. 1955-1962.

Q. Wei et al., "Preparation of Superhard Functionally Graded Tetrahedral Amorphous Carbon Coatings by Pulsed Laser Deposition", Mat. Res. Soc. Symp., vol. 617, 2000, pp. J7.7.1 to J7.7.6.

J. A. Heimberg et al., "Superlow Friction Behavior of Diamond-Like Carbon Coatings: Time and Speed Effects", Applied Physics Letters, vol. 78, No. 17, Apr. 23, 2001, pp. 2449-2451.

L. Kogut et al., "A Semi-Analytical Solution for the Sliding Inception of a Spherical Contact", Journal of Tribology, vol. 125, Jul. 2003, pp. 499-506.

E. Riedo et al., "Young Modulus Dependence of Nanoscopic Friction Coefficient in Hard Coatings", Applied Physics Letters, vol. 83, No. 10, Sep. 8, 2003, pp. 1986-1988.

L. Kogut et al., "A Static Friction Model for Elastic-Plastic Contacting Rough Surfaces", Transactions of the ASME, vol. 126, Jan. 2004, pp. 34-40.

C.-H. Hsueh, "Master Curves for Hertzian Indentation on Coating/Substrate Systems", J. Materials Res., vol. 19, No. 1, Jan. 2004, pp. 94-100.

C.-H. Hsueh, "Combined Empirical-Analytical Method for Determining Contact Radius and Indenter Displacement During Hertzian Indentation on Coating/Substrate Systems", J. Materials Res., vol. 19, No. 9, Sep. 2004, pp. 2774-2781.

* cited by examiner

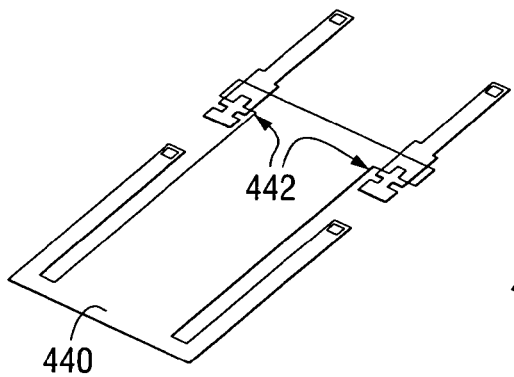
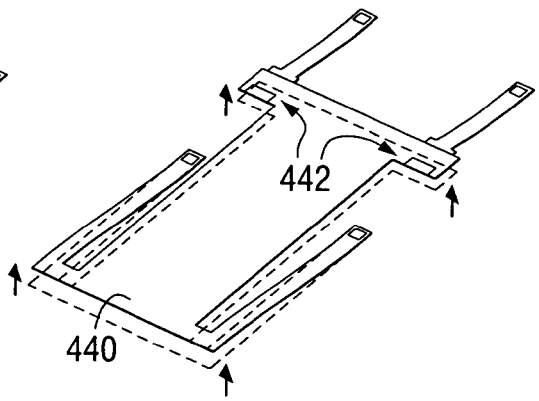
FIG. 25    FIG. 26
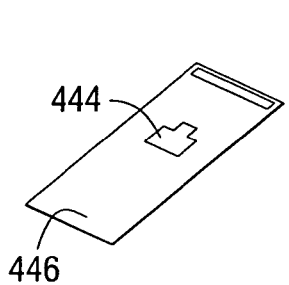 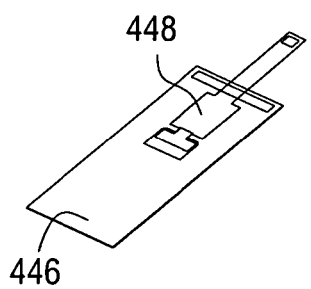 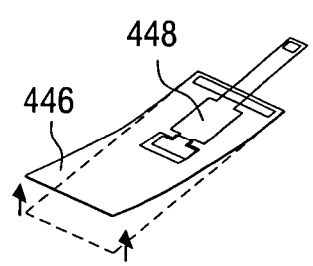
FIG. 27    FIG. 28    FIG. 29

ELEVATED ELECTRODES FOR PROBE POSITION SENSING

FIELD OF THE INVENTION

This invention relates to data storage devices, and more particularly to probe storage devices that include ferroelectric storage media.

BACKGROUND OF THE INVENTION

Ferroelectric materials can form the basis for data storage devices, where digital "1" and "0" levels are represented by the electric polarization of a ferroelectric film pointing "up" or "down". Storage devices based on a ferroelectric storage medium include Ferroelectric Random Access Memory (FeRAM) and scanning probe storage systems ("FE-Probe").

In an FeRAM memory cell the essential storage element includes a thin ferroelectric film sandwiched between fixed, conductive electrodes. To write a bit to such a cell, a voltage pulse of either positive or negative polarity is applied between the electrodes in order to switch the internal polarization of the ferroelectric film to the "up" or "down" state, respectively. To read back the data from the FeRAM cell, a read voltage of a certain polarity (e.g., positive) is applied, which switches the polarization of the ferroelectric film in cells storing a "0" ("down" polarization), while having no effect in cells storing a "1". A sense amplifier measures the charge flow that results when the polarization switches, so that a current pulse is observed for cells which stored a "0", but not for cells which stored a "1", thus providing a destructive readback capability.

In an FE-Probe device, one of the electrodes (referred to as a "tip") is movable relative to the media. In both cases the binary "1" and "0" are stored by causing the polarization of the ferroelectric film to point "up" or "down", either in the entire cell in the case of FeRAM, or in a spatially small region (domain) local to the tip in the case of the FE-Probe. Data can then be read out destructively by applying a voltage of a magnitude and polarity such as to cause the polarization to point "up". Cells (FeRAM) or domains (FE-Probe) polarized "down" (e.g., representing "0"), will then switch to the "up" state, and a charge will flow which is proportional to the remanent polarization of the ferroelectric film. Cells or domains polarized "up" will have no such current flow. The presence or absence of this current flow, as determined by a sense amplifier, can then be used to determine whether the cell or domain had contained a "1" or "0". However, for a typical domain size of 25 nm×25 nm, desirable for an FE-Probe device, the resulting charge would be limited to about 6000 electrons, giving a current of about 1 nA for a read time of 1 microsecond, which makes high-speed, low error-rate readout difficult. In addition, the readback is necessarily destructive, i.e., not preserving the original data.

Probe storage devices have been proposed to provide small size, high capacity, low cost data storage devices. A scanning probe storage device based on ferroelectric media includes one or more heads, each including an electrode that moves relative to a ferroelectric thin film media. Binary "1's" and "0's" are stored in the media by causing the polarization of the ferroelectric film to point "up" or "down" in a spatially small region (domain) local to the electrode, by applying suitable voltages to the electrode. Data can then be read out by a variety of means, including sensing of piezoelectric surface displacement, measurement of local conductivity changes, or by sensing current flow during polarization reversal (destructive readout). Regardless of the readback mechanism, the head or heads should be mechanically robust, compatible with the ferroelectric media, provide intimate electrical proximity to the media, provide a ground plane to shield for noise, and include an area of hard insulator around the read/write electrode to allow the head to "fly" on lubricant and slow wear. Finally the heads need to be manufacturable by a process compatible with the integrated silicon-based electronic circuits required for readout in a practical storage device. Standard tips manufactured for Scanning Probe Microscopy (SPM) do not meet these requirements.

One of the challenges in designing probe storage devices is obtaining accurate position feedback for servo loops. Track densities in probe storage are much higher than in magnetic recording, with for example, up to 600 K tracks per inch (TPI). Such high track densities place great demands on the servo positioning system. In fact, for a 20 GB product it is estimated that positioning accuracy must be maintained to within 3 nm. Such accurate positioning requires extremely accurate sensing.

One of the challenges in the probe storage area is maintaining accurate spacing between the head and media wafers. The proposed spacing is 30 µm with head and media wafers that are 13×13 mm². Variations in this spacing could modify the contact force, angle, and position of the probe head against the media wafer, thus potentially introducing noise in read and write and compromising the reliability of the head and the media mechanical interfacing.

Manufacturing tolerances are expected to result in static variations in head and media spacing from device to device. The stack-up tolerances may include head and media wafer thickness variation, adhesive thickness variation, and injection molding precision of the actuator and package. These tolerances could be as large as 10 or more microns.

Vibration and shock are expected to result in dynamic changes in the head and media spacing for a given device. The translation stage to which the media (or the head) substrate is attached is suspended by flexible springs, which allow large linear translation motions. Unfortunately these springs may also allow vertical motions and tilting motions in the presence of external disturbances. Depending on the stiffness of the support springs and the direction of the external forces, the head levers may bend a fraction of a micron to ten's of microns. In the worst case, the probe heads may lose contact with the media.

To date solutions have focused on using high-aspect-ratio springs (width-to-thickness>5) to passively maintain head-media spacing or actuators to actively control the media wafer. The high-aspect-ratio springs are difficult to manufacture using conventional (non-MEMS) technology and could not easily provide the required vertical stiffness and horizontal flexibility simultaneously. Active control (of vertical translation and two axes of tilt) requires additional mechanics and electronics for the actuators and control circuitry, which are prohibitive given the tight space and power budget.

There is a need for a probe storage apparatus that can achieve the required position sensing accuracy.

SUMMARY OF THE INVENTION

This invention provides an apparatus comprising a storage medium, a head substrate, wherein the storage medium and the head substrate are separated by a gap, a plurality of electrodes separated from each other, and a support structure positioned in the gap for supporting some of the electrodes.

In another aspect, the invention provides an apparatus comprising a storage medium, a head substrate, wherein the storage medium and the head substrate are separated by a gap, a plurality of posts positioned in the gap, and a layer of low friction material positioned on one end of each of the posts.

The invention further encompasses an apparatus comprising a storage medium, a head substrate, wherein the storage medium and the head substrate are separated by a gap, and a plurality of electrodes separated from each other to form sensor capacitors, wherein some of the electrodes extend into the gap to increase the capacitance between the electrodes.

BRIEF DESCRIPTION OF THE DRAWINGS

FIGS. 25 and 26 show elevated electrodes and locking mechanisms with overlapping structural layers.

FIGS. 27, 28 and 29 show a locking beam on top of a lifted structure.

DETAILED DESCRIPTION OF THE INVENTION

Figure 1:
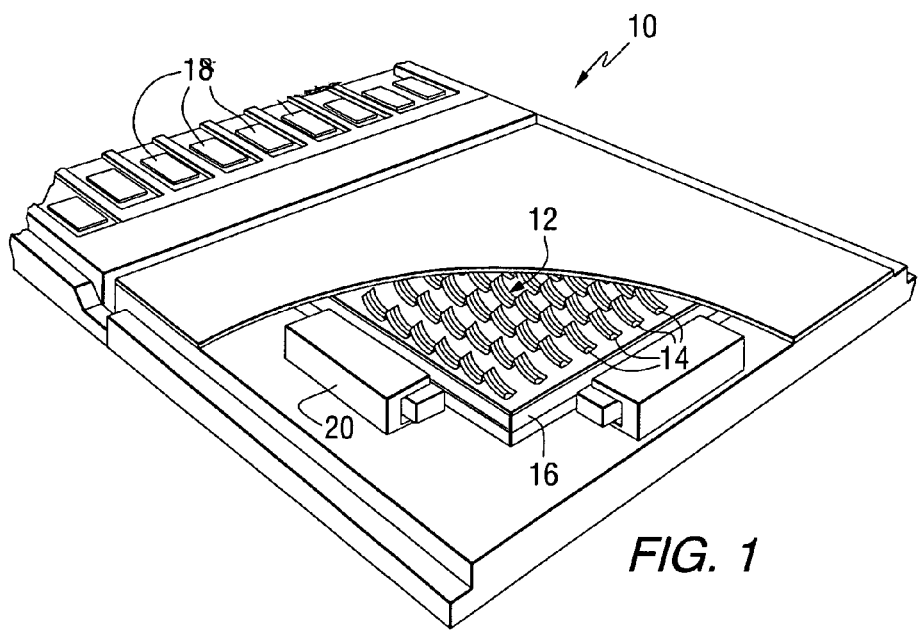
FIG. 1 is a perspective view of a ferroelectric storage array in accordance with the present invention.

This invention provides probe storage devices that include a ferroelectric storage medium. FIG. 1 is a perspective view of a ferroelectric storage device 10, which illustrates an implementation of a storage system constructed in accordance with the present invention. In the ferroelectric storage device 10 of FIG. 1, an array 12 of ferroelectric heads 14 is positioned adjacent to a storage medium 16. In the configuration shown in FIG. 1 the array 14 and the medium 16 are planar and extend generally parallel with each other. The array 14 comprises a plurality of electrodes, which are operably coupled to connectors 18. The storage medium 16 is coupled to at least one actuator 20, which is configured to move the medium 16 relative to array 12. This movement causes the ferroelectric heads to be moved relative to the individual ferroelectric domains on medium 16. Each head can include one or more electrodes. To address the destructive readback of data, one technique maintains at least one sector on the storage medium 16, which is available for writing data during a read operation. This available sector is thereby used to reproduce the data, which is being destructively read back. Other techniques rewrite the data to the same domain or to other locations on the media.

Figure 2:
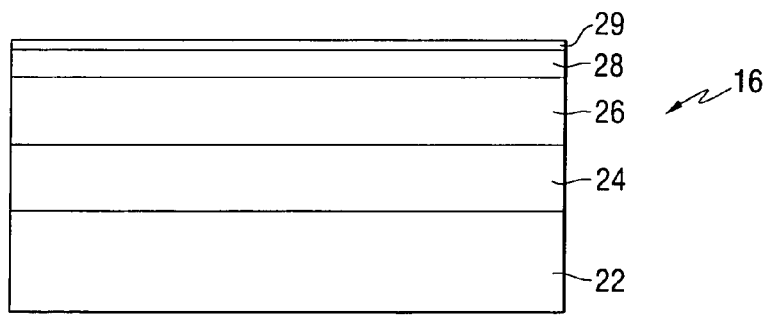
FIG. 2 is a cross-sectional view of a portion of a ferroelectric storage medium.

FIG. 2 is a side view of a ferroelectric storage medium 16. In this embodiment the storage medium includes a substrate 22, which can be for example Si, a first layer 24 which can be for example $SrTiO_3$ positioned on the substrate, a layer 26 which can be for example $SrRuO_3$ positioned on the first layer, and a ferroelectric layer 28 which can be for example lead zirconium titanate (PZT) positioned on the second layer. However, other intermediate layers may be used to align the structures between the substrate and the PZT film. In addition, the PZT layer can be doped with other materials, such as lanthanum. While specific example materials are described here, it should be understood that this invention is not limited to the example materials.

Due to electric field spreading in the ferroelectric film, a thin ferroelectric layer is needed for high bit densities. The domain wall stability may improve with thinner films, thereby providing better thermal stability. A top layer 29 can be included to minimize cantilever wear. This material can be liquid or solid lubricant with a high dielectric constant. In one example, the first layer has a thickness of about 100 nm, the second layer has a thickness in the range from about 50 nm to about 100 nm, and the PZT layer has a thickness in the range of 10 to 30 nm. The lubricant layer can have a thickness of 1-3 nm.

Figure 3:
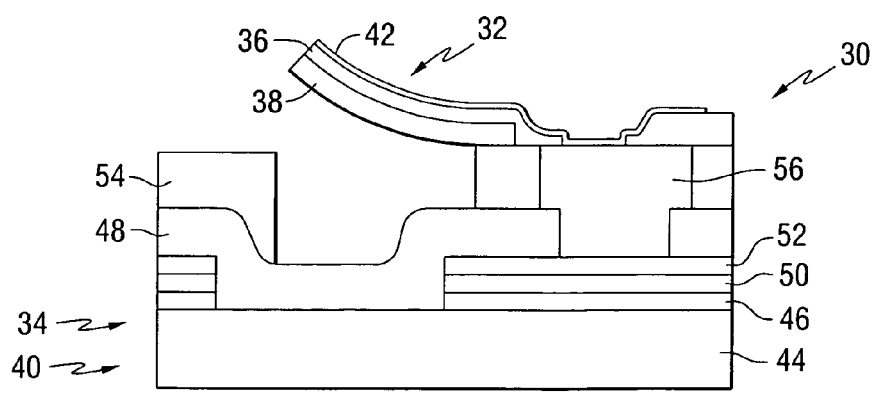
FIG. 3 is a schematic illustration of one embodiment of a probe lever, and its mechanical and electrical support structures.

This invention includes a probe head designed for scanning probe storage, and a method for fabricating the probe head. FIG. 3 is a schematic illustration of one embodiment of the probe head assembly 30 including a lever 32, and its mechanical and electrical support structures 34. The probe lever includes a pair of thin films 36 and 38 (bilayer), deposited on a substrate 40 containing other supporting films and/or electronic circuitry, and whose biaxial stress levels are chosen to ensure that the bilayer wants to bend up from the underlying substrate. This can be achieved by choosing the lower film 36 in the bilayer to have more compressive biaxial stress than the second layer 38 in the bilayer. This stressed bilayer is deposited overlapping a sacrificial layer (not shown in FIG. 3), which is removed selectively by a chemical process, so that the bilayer will bend up from the substrate when the sacrificial layer is removed. The bilayer has a suitable metal or conductive metal-oxide layer 42 (referred to as a lead) attached to it, so that the lever substrate can be brought in proximity to the ferroelectric media, and the probe metal brought in electrical contact with the media to allow data reading and writing. The probe metal is chosen to be mechanically hard (to resist wear), to be chemically compatible with the media (to avoid media or electrode degradation), and to have high electrical conductivity in both its bulk and surface. Electronic circuitry can be integrated into the substrate. All materials are deposited and processed using relatively low-temperature processes<<150° C.) that will not be detrimental to the electronic circuitry. In fact, it is a distinct advantage to have a lever process that uses lower temperatures and can be deposited on top of electronic circuitry so that a preamplifier or sense amplifier can be located at the end of the lever to minimize stray noise and improve signal quality.

In this example, the substrate includes a first layer 44, which supports a first conductor adhesion layer 46 and an insulating layer 48, of for example, alumina. A conductor 50 is positioned on the first conductor adhesion layer 46, and a second conductor adhesion layer 52 is positioned on the conductor 50. A passivation layer 54 is provided on the insulating layer. A conductor plug 56 provides an electrical connection between the conductor 50 and the probe 32 through a via in the passivation layer and the insulating layer. While one lead is shown in this example, it should be understood that multiple leads and other structures can be included in the lever.

Figure 4:
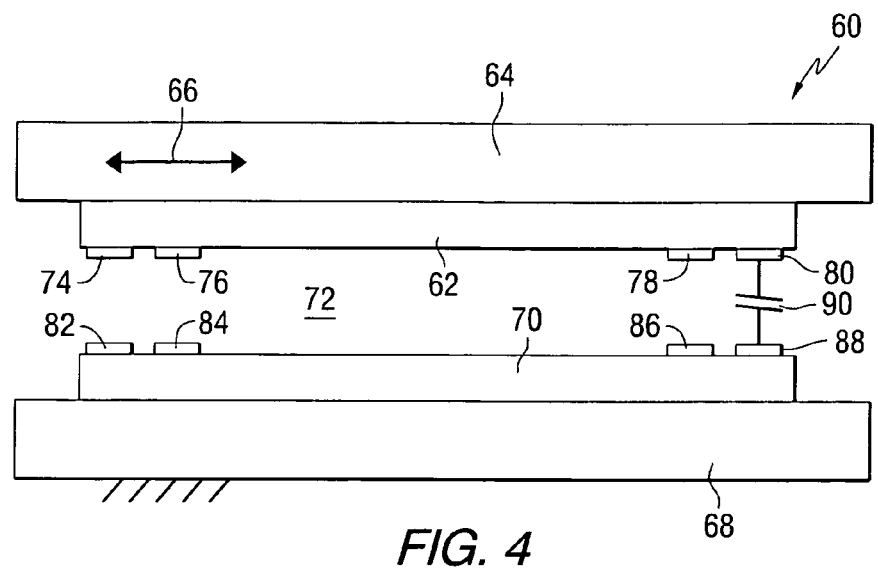
FIG. 4 is a schematic representation of a probe storage device.

FIG. 4 is a schematic representation of a probe storage device 60. The device includes a storage media 62 mounted on a sled 64 that can move as illustrated by arrow 66 using actuators not shown in this view. The device package 68 supports a head having a head substrate 70 and a plurality of probes, not shown in this view. A gap 72 exists between the media and the substrate. Capacitive sensor electrodes 74, 76, 78, 80, 82, 84, 86 and 88 are built onto the head and media wafers. The electrodes are spaced apart to form capacitors, as illustrated by capacitor 90. As the media moves, capacitance changes can be used to provide feedback.

Probe sensing is different from conventional disc drive sensing in that: continuous feedback is available from the use of absolute position sensors; servo marks may need to be prewritten due to a destructive readback process; and during a given read/write operation a plurality of heads can be accessed simultaneously with only one servo degree of freedom, which means that many more degrees of freedom are potentially sensed than controlled. A combination of capacitive sensors can be used to measure the relative position between the head and media wafers and embedded servo marks in the media can be used to place the data relative to the wafers. The embedded servo marks are needed to account for drift differences between the data and the capacitive sensors and also to sense errors in individual tip positions. A feedback-based positioning system is fundamentally limited by its sensing noise. One example of a probe storage device requires a resolution of 0.4 nm.

The capacitive sensors may be created by patterning metal electrodes on the opposing surfaces on the media substrate and the head substrate, as shown in FIG. 4. It is most convenient to do so since the electrodes may be created on the wafer level before dicing and no additional steps are added to the probe device assembly process. However, a portion of the recording area is sacrificed to create these electrodes. Alternatively, these electrodes may be fabricated on separate substrates, but would increase part counts, assembly costs, and possibly assembly tolerance. Therefore, integration of the electrodes with the head and media substrates is a desirable approach.

Figure 5:
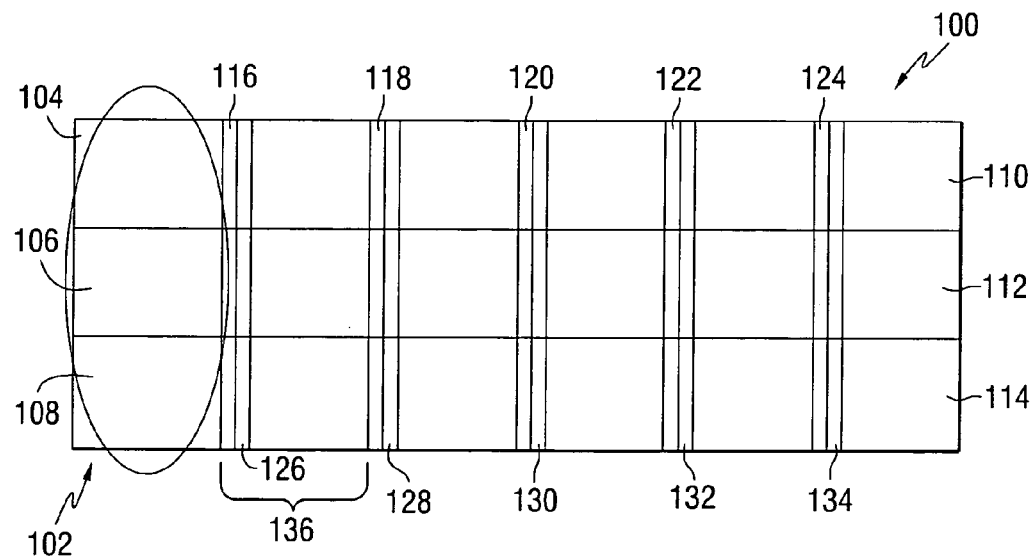
FIG. 5 is a schematic representation of a portion of the storage media.

One approach to position sensing uses the capacitive sensor for seeks and writing servo marks only, with the tracking position feedback produced by a dedicated servo tip as shown in FIG. 5. Capacitive sensors may be used to help writing servo patterns on the media in-situ. In addition, capacitive sensors can provide more bandwidth (that is, a higher sampling rate) for servo control than embedded servo marks. The sensitivity of the capacitive sensors is a strong function of the gap spacing between the media and head substrate electrodes. This invention provides structures for reducing the gap spacing in order to achieve the necessary position accuracy for probe storage.

FIG. 5 is a schematic representation of a portion of the storage media 100 having a servo field 102, including servo data 104, 106 and 108 written in tracks 110, 112 and 114. A plurality of guard bands 116, 118, 120, 122 and 124, and a plurality of erase-readback sections 126, 128, 130, 132 and 134 extend across the tracks. Servo data can be prewritten in the servo fields on an external servo writer or in-situ. The access area for a given tip is illustrated as item 136.

In FIG. 5, all control is done off of the embedded pattern and the capacitive sensors are used for seeks and servo writing. Having a dedicated tip also allows substantial timing information to be encoded. Unfortunately, initial calculations show the sampling rate to be insufficient. Given that an embedded-only servo will likely not have a sufficient sampling rate, the capacitive sensors must be capable of meeting the required resolution and will likely be used for primary servo with only drift correction from the embedded servo marks.

Figure 6:
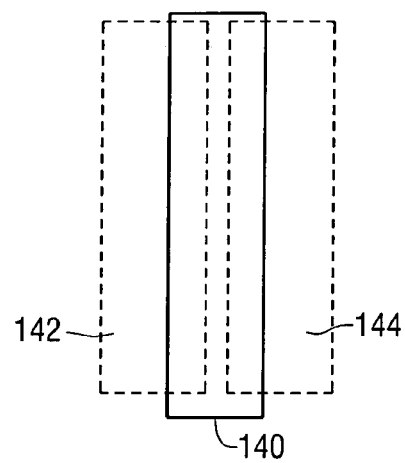
FIG. 6 is a parallel plate capacitor.

Accurate capacitive sensors require either a large area or close spacing. A simple parallel plate capacitor is shown in FIG. 6. An upper electrode, or plate, 140 is shown to be positioned above two lower electrodes, or plates, 142 and 144. The plates will have at least the same spacing as the head-media spacing, for example, approximately 30 μm. A large sensor area (of for example 16 mm$^2$) is required to achieve the specified accuracy at such a spacing, and if the sensor is placed on the head and media wafers the large area reduces servo format efficiency.

In FIG. 6, the two bottom plates would be on the media wafer and the upper plate would be on the head wafer. The media plates are driven with a high frequency sine wave. The current output of the head plate measures out-of-plane and in-plane displacement when the plates are driven with the same wave and opposite waves, respectively.

Figure 7:
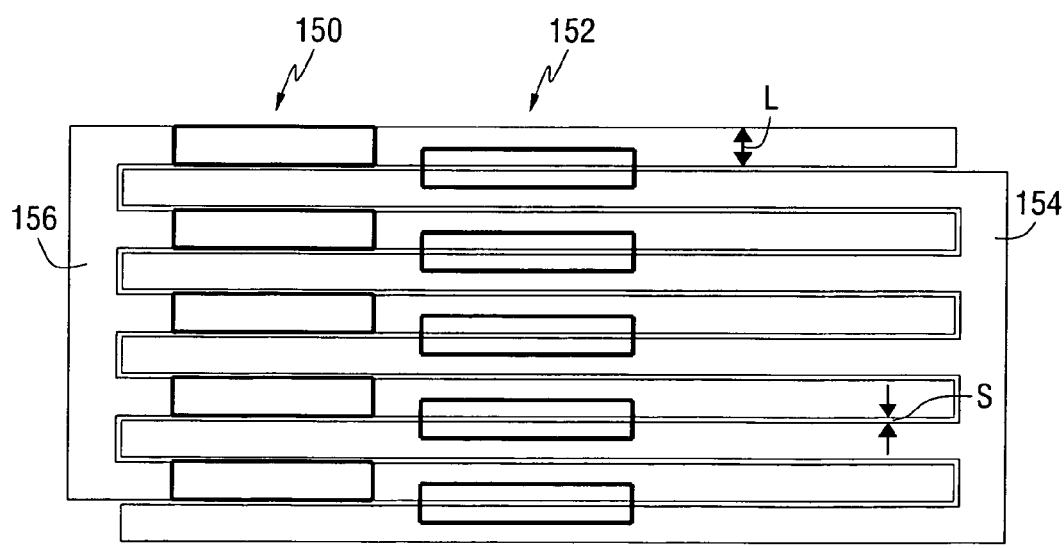
FIG. 7 illustrates a capacitive encoder architecture.

The problem of capacitive sensor spacing becomes more pronounced as the design moves from the simple architecture of FIG. 6 to the encoder scheme of FIG. 7. FIG. 7 illustrates a capacitive encoder architecture including sensors 150 and 152. The sensors measure normal and quadrature encoder signals.

For a 64×64 head array, the required stage travel is 200 μm, and 19 bits of analog-to-digital converter (ADC) resolution are needed to obtain the required 0.4 nm resolution. A 19-bit digital-to-analog converter (DAC) is expensive and difficult to build, and so an encoder architecture is proposed to limit the number of bits. The positive and negative drive voltages are applied to an interlocking set of fingers 154 and 156. Two sets of sensing fingers are used to obtain the normal and quadrature signals from the encoder. The finger architecture allows the area of overlap, and hence the signal, to be large.

Figure 8:
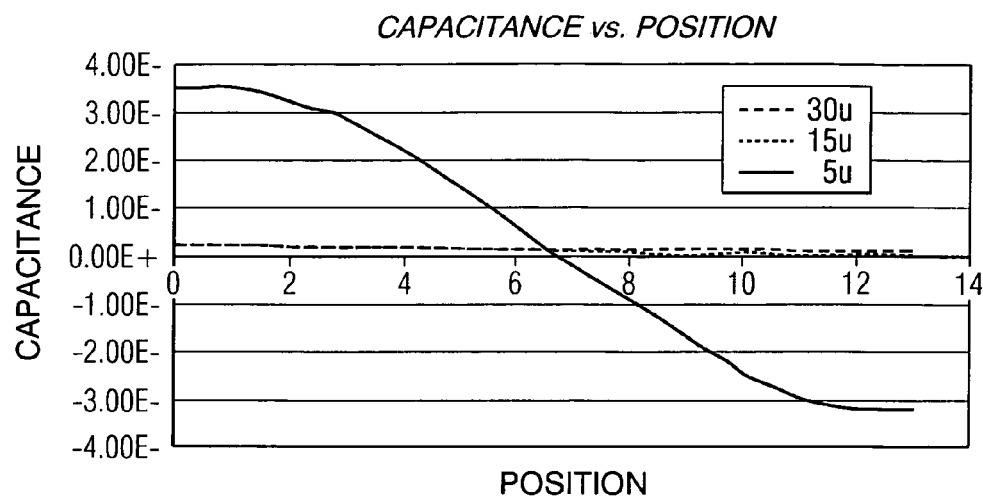
FIG. 8 is a graph of capacitance versus position.

However, the space between fingers will likely be small, much smaller than the 30 μm space between head and media wafers. In fact, for a 16-bit ADC limit L+S<13 μm, where L is the width of the fingers, and S is the spacing between the fingers. Small inter-finger portions lead to large fringing fields between the fingers of opposite polarity, and the z-spacing between the sense and drive fingers must be made smaller to improve the signal-to-noise ratio (SNR). This will likely require z-spacings well below 10 μm to achieve an adequate SNR. FIG. 8 shows simulation results for encoders with L=6 μm and S=7 μm at 30 μm, 15 μm, and 5 μm sensor spacings. It is clear that fringing fields dominate for both 15 μm and 30 μm spacings. As shown in FIG. 8, at 5 μm spacing, the encoder behaves as expected. However, at 15 μm and 30 μm spacing, the fringing fields dominate the performance.

Despite several viable schemes of using capacitive sensors to compliment embedded servo marks, large physical spacing between the capacitive sensor electrodes (~30 μm governed by assembly tolerance and head designs) prohibits the capacitive sensors from providing adequate SNR to implement the desired sensing and control schemes for probe storage. Therefore, some means is needed to reduce the gap spacing. This invention provides a structure that can reduce the current physical gap spacing by 60% or more.

Figure 9:
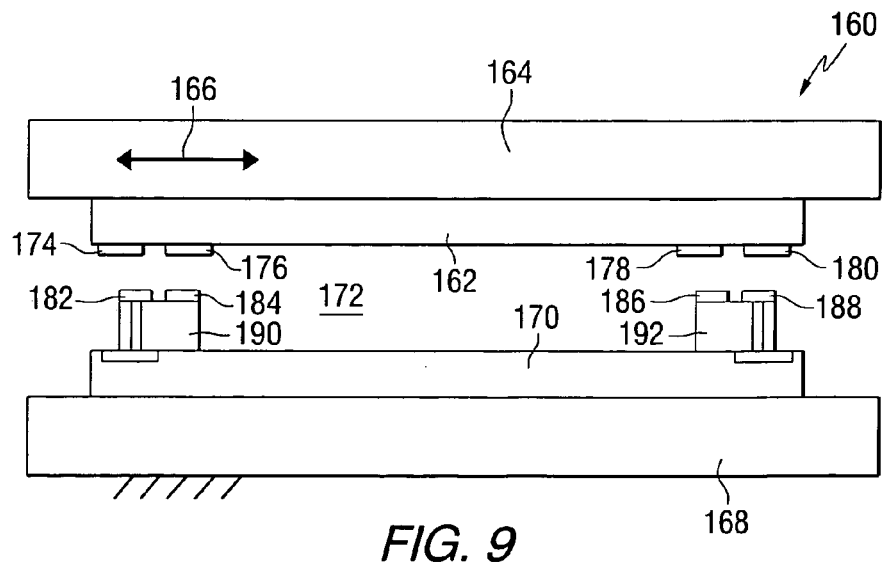
FIG. 9 is a schematic representation of a probe storage device.

Storage devices of this invention can be constructed using micro-electromechanical system (MEMS) processing techniques to raise the electrodes off the plane of the substrate as shown in FIG. 9. FIG. 9 is a schematic representation of a probe storage device 160. The device includes a storage media 162 mounted on a sled 164 that can move as shown by arrow 166 using actuators not shown in this view. The device package 168 supports a head having a head substrate 170 and a plurality of probes, not shown in this view. A gap 172 exists between the media and the substrate. Capacitive sensor electrodes 174, 176, 178, 180, 182, 184, 186 and 188 are built onto the head and media wafers.

In the example of FIG. 9, the electrodes are raised off of the plane of the substrate to achieve a tighter gap. More particularly, electrodes 182, 184, 186 and 188 are built onto rigid posts 190 and 192, which are in turn built on the head substrate. The MEMS processing techniques allow the spacing to be controlled very tightly (depending on the rigidity of the overall head-media interface).

This invention increases the accuracy of capacitive sensors for a given area, or decreases the area required to achieve a given resolution. With this invention, the capacitive sensor electrode gaps may be decreased by 80 to 90%, thus increasing the sensor signal by 20 times or greater. The ability to tighten the gap between sensor electrodes allows the format efficiency of capacitive sensors to be much greater and reduces the impact of placing the electrodes on the head and media wafers.

In addition, the smaller gap will enable use of the capacitive encoder approach, which is needed to reduce analog-to-digital converter (ADC) requirements. If the encoder approach is not used, the ADC becomes much more expensive since it must have extremely low drift and very high resolution. In particular, the gap between the facing electrodes must be less than the finger spacing.

The following paragraphs describe in greater detail several embodiments of the invention. In all embodiments the media is assumed to be attached to a moving sled and the head substrate is assumed to be fixed to the package. However, the invention would also apply to a configuration where the head substrate is mounted on a moving sled and the media is stationary. The elevated electrodes may conceptually be located on either the head substrate or the media substrate. The description below will focus on locating the elevated electrodes on the MEMS-processed head substrate. For processing simplicity we can use the head processing steps to make the position sensor at the same time with few or no new steps.

Figure 10:
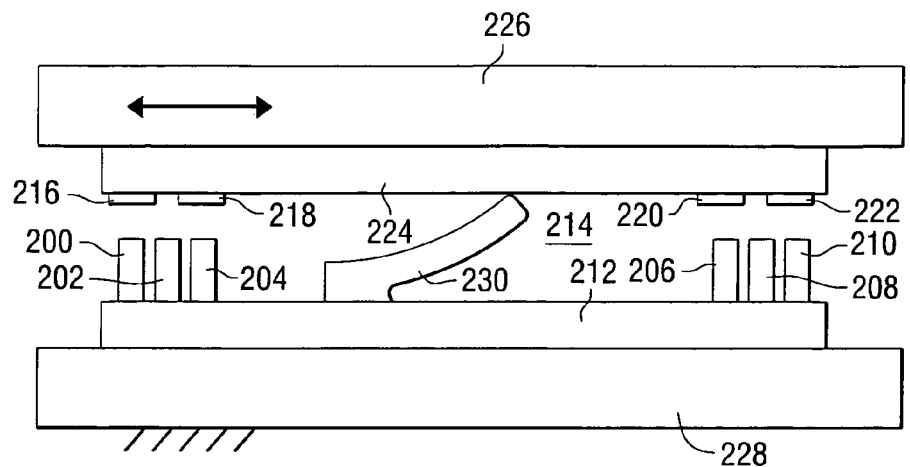
FIG. 10 is a schematic representation of a probe storage device where the electrodes are built directly onto the head substrate.

In a first embodiment of the invention, the electrodes 200, 202, 204, 206, 208 and 210 are built directly onto the head substrate 212 as shown in FIG. 10. In this embodiment, the gap 214 between the elevated electrodes and the electrodes 216, 218, 220 and 222 mounted on the media 224, can be less than 3 μm. The media is attached to a movable sled 226, and the head substrate is mounted on a package 228. A plurality of probes 230, only one of which is shown, extend from the head substrate to the media.

Figure 11:
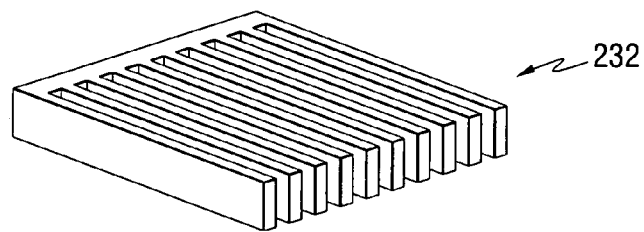
FIG. 11 shows an isometric view of the raised electrodes.

FIG. 11 shows an isometric view of the raised electrodes 232. The advantage of this approach is that the electrodes are created in only one electroplating step. A thick photoresist, such as SU8, may be used to create a mold for plating. Since the plated material would be conductive, no special effect is required to create out-of-plane electrical interconnects to the elevated electrodes. Depending on plating uniformity, a CMP (chemical-mechanical polishing) step may or may not be required.

In FIG. 10, the electrodes are built directly onto the head substrate. The advantage is that only one electroplating step is needed to create the electrodes.

Figure 12:
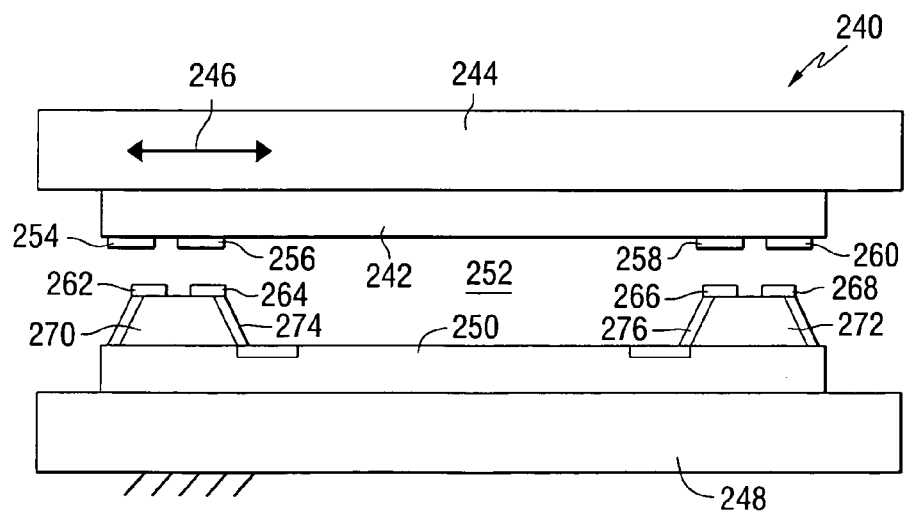
FIG. 12 shows a practical implementation of elevated electrodes shown in FIG. 9.

Another embodiment with few processing steps is shown in FIG. 12, which is a practical implementation of elevated electrodes shown in FIG. 9. FIG. 12 is a schematic representation of a probe storage device 240. The device includes a storage media 242 mounted on a sled 244 that can move as shown by arrow 246 using actuators not shown in this view. The device package 248 supports a head having a head substrate 250 and a plurality of probes, not shown in this view. A gap 252 exists between the media and the substrate. Capacitive sensor electrodes 254, 256, 258, 260, 262, 264, 266 and 268 are built onto the head and media wafers.

In the example of FIG. 9, the electrodes are raised off of the plane of the substrate to achieve a tighter gap. More particularly, electrodes 262, 264, 266 and 268 are built onto rigid posts 270 and 272, which are in turn built on the head substrate. The sidewalls of the rigid post or platform on which the electrodes rest are sloped so that metal lines 274 and 276 may be patterned on the sidewalls to form electrical interconnects to the elevated electrodes. This platform can be made with polymer material such as SU8. The sidewalls may be created using gray scale masking. Once the platform is created, the blanket metal deposition (evaluation) step may be used to create the elevated electrodes and sidewall interconnects, either by using a shadow mask or by a metal liftoff process using a conformal photoresist. In both cases, the metal lithography can be optimized to produce precise, finer line width and spacing at the top of the platform for the electrodes. The sidewall interconnects may be formed with coarse line width and shape as long as low-resistance conducting paths are formed.

Figure 13:
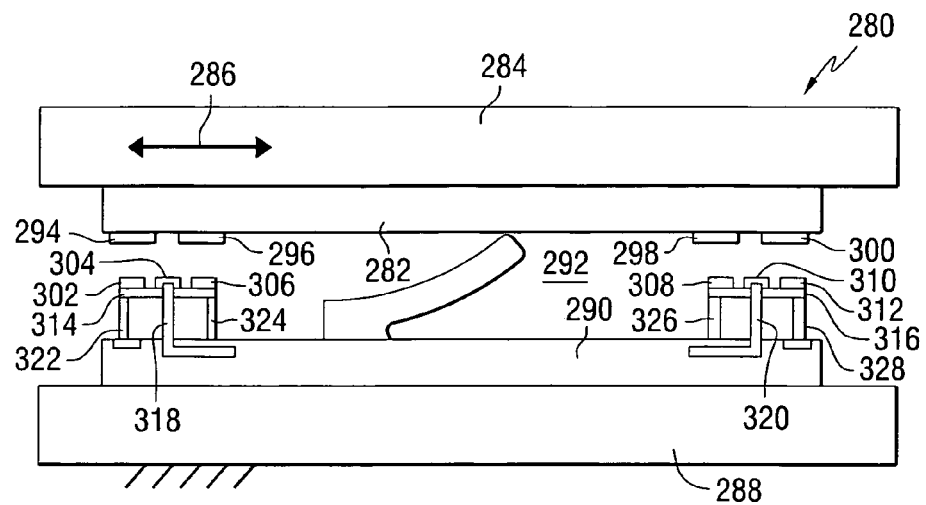
FIG. 13 is a schematic representation of a probe storage device where the electrodes are located on planes (or plates) suspended above the substrate.

FIG. 13 is a schematic representation of a probe storage device 280. The device includes a storage media 282 mounted on a sled 284 that can move as shown by arrow 286 using actuators not shown in this view. The device package 288 supports a head having a head substrate 290 and a plurality of probes, not shown in this view. A gap 292 exists between the media and the substrate. Capacitive sensor electrodes 294, 296, 298, 300, 302, 304, 306, 308, 310 and 312 are built onto the head and media wafers.

Figure 14:
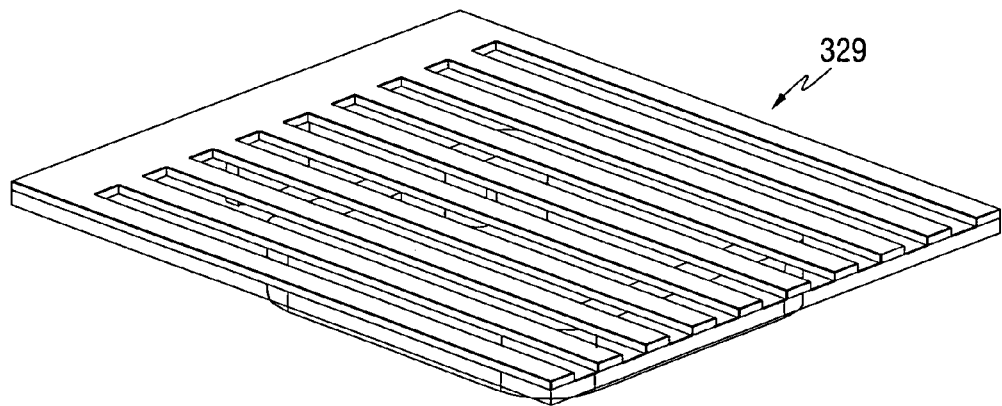
FIG. 14 is a 3-D Model of an elevated electrode structure.
Figure 15:
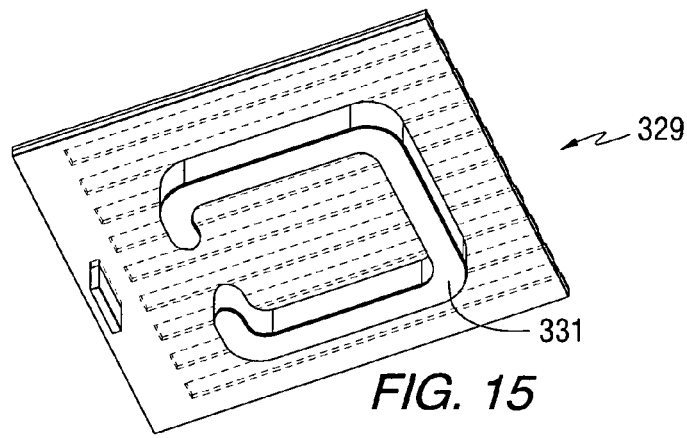
FIG. 15 is a schematic representation of a probe storage device with the electrodes located on elevated planes resting on a rigid support structure.

In the example of FIG. 13, the electrodes are raised off of the plane of the substrate to achieve a tighter gap. More particularly, electrodes 302, 304, 306, 308, 310 and 312 are located on backplanes (or plates 314 and 316) suspended above the substrate. This plane may be made of a single insulating layer. Additional conductive layers may be used to shield the bottom side of the electrodes. The signal from the electrodes travels through the insulating layer to the head substrate on small conductors 318 and 320. Electrode backplane supports 322, 324, 326 and 328 can be used to support the backplanes. The vertical conductor layer may also be used to form the support of the elevated support plane for the electrodes. A possible elevated electrode design 329 is illustrated in FIG. 14. FIG. 15 is a bottom view of the elevated electrode showing a backplane vertical support 331. FIG. 13 shows electrodes that are separated from a supporting structure by an insulating layer. The signal travels through the insulating layer to the head substrate via a small conductor.

One method of fabricating such elevated electrodes of FIGS. 14 and 15 is as follows. First, a thick photoresist is used to create a mold for the vertical interconnect and the vertical support of the elevated plane. Then the vertical support is plated. Before the mold is removed, an insulting layer (low-stress material such as aluminum oxide) is deposited and patterned (to create interconnect via and the electrode support plane). Metal is patterned on the top of the plane to create the electrodes. Then the mold (or mold material) is completely removed. To facilitate mold removal, small openings may be added to the insulting plane. Furthermore, the vertical supports should take the shape of open lines and contours.

A benefit of this approach is that the plane height and the line width and spacing of the electrodes are independently controlled variables. The electrodes, which may be made of a thin layer of metal, can be created very precisely. Due to the planar nature of the electrodes, parasitic effects due to sidewalls are eliminated. Parasitic effects from the bottom side of the electrodes are still possible, but may be minimized by using a multi-layer plane (with an embedded shield) or by shielding the center of the electrode plane by the use of a grounded metal support surrounding the edge of the plane. In addition, this embodiment may be fabricated using traditional metal plating, deposition, and lithography methods. More masking steps however are required compared to the embodiments described earlier.

Figure 16:
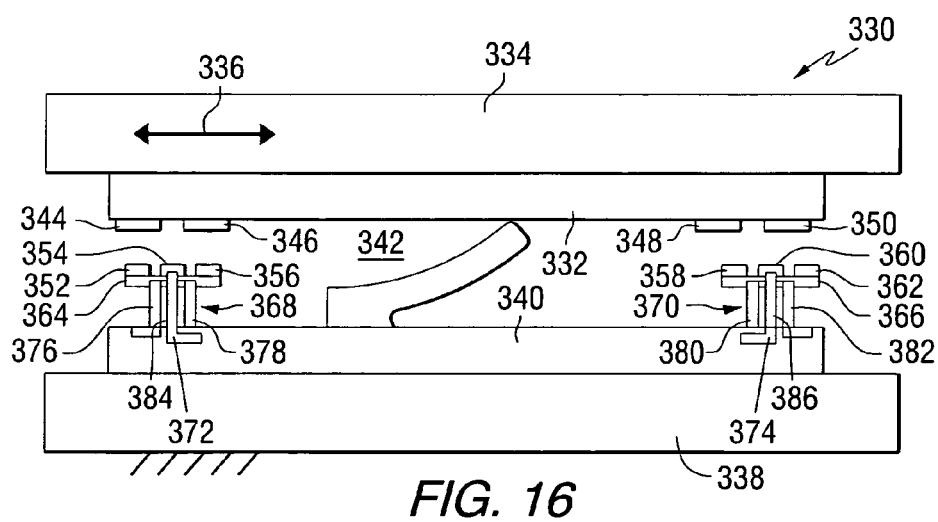
FIG. 16 is a schematic representation of a probe storage device having a signal shield.

FIG. 16 is a schematic representation of a probe storage device 330. The device includes a storage media 332 mounted on a sled 334 that can move as shown by arrow 336 using actuators not shown in this view. The device package 338 supports a head having a head substrate 340 and a plurality of probes, not shown in this view. A gap 342 exists between the media and the substrate. Capacitive sensor electrodes 344, 346, 348, 350, 352, 354, 356, 358, 360 and 362 are built onto the head and media wafers. In the embodiment shown in FIG. 16, the electrodes are again located on elevated planes 364 and 366 resting on a rigid support structure 368 and 370. These planes may be made of a single insulating layer or multiple layers (with embedded shields to shield the bottom side of the electrodes). The electrode signal goes through the insulating layer through conductors 372 and 374. Electrically conductive shields 376, 378, 380 and 382 are provided such that the signal travels to the head substrate via a shielded connection. The signal path to the head substrate is surrounded by an insulating layer 384 and 386, which is in turn surrounded by grounded signal shields.

Figure 17:
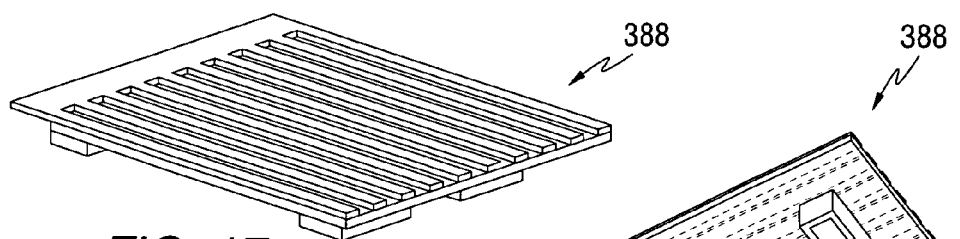
FIGS. 17 and 18 show a 3-D Model of an elevated electrode structure.
Figure 18:
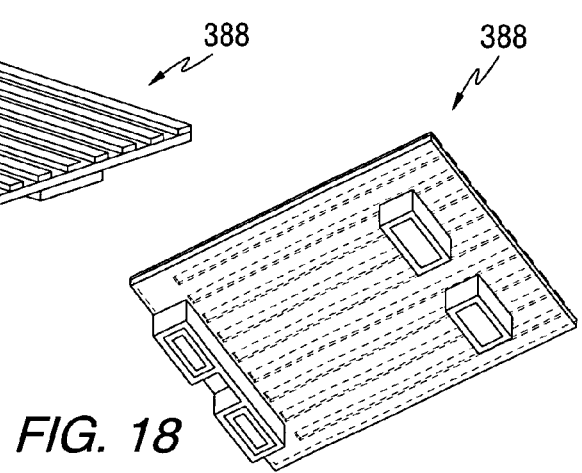

The shielded post structures are posts whose outer wall is made of metal and the inside core made of an alternative material. This composite post concept is beneficial for creating thick solid post supports without compromising plating time or plating uniformity. FIG. 16 shows an embodiment in which a signal shield is added to the signal path from the electrodes to the head substrate. FIGS. 17 and 18 show a 3-D Model of the electrode structures 388 of FIG. 16.

One method of fabricating the elevated electrodes of FIG. 16 is as follows. First, a thick photoresist is used to create a mold for the vertical interconnect, the vertical shields, and the vertical support of the elevated plane. Then the vertical shields are formed by closed curves (or lines). Next, the vertical support is plated. Before the mold is removed, an insulting layer (low-stress material such as aluminum oxide) is deposited and patterned (to create interconnect via and the electrode support plane). Closed curves forming vertical shields or composite vertical posts must be fully covered by this layer. Then metal is patterned on the top of the plane to create the electrodes. The mold (or mold material) is then completely removed. Trapped mold material will remain permanently. To facilitate mold removal, small openings may be added to the insulting plane. Furthermore, the vertical supports should take shape of open lines and contours.

Figure 19:
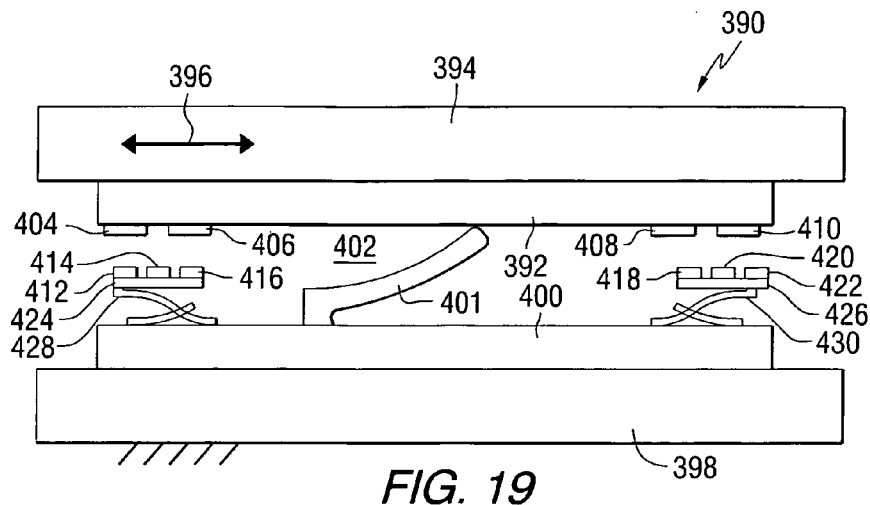
FIG. 19 is a schematic representation of a probe storage device where elevated electrodes are created using plates and curved beams.

FIG. 19 is a schematic representation of a probe storage device 390. The device includes a storage media 392 mounted on a sled 394 that can move as shown by arrow 396 using actuators not shown in this view. The device package 398 supports a head having a head substrate 400 and a plurality of probes, for example probe 401. A gap 402 exists between the media and the substrate. Capacitive sensor electrodes 404, 406, 408, 410, 412, 414, 416, 418, 420 and 422 are built onto the head and media wafers. In FIG. 19, elevated electrodes are created using plates 424 and 426 and curved beams 428 and 430 alone, but no bulk material deposition or patterning. In other words, the three-dimensional elevated plates and support structures are made of two-dimensional plates and beams, which are lifted or curled up, similar to folded paper models. The elevated electrodes would be "assembled" (either automatically or partially automatically) rather than fabricated from bulk material. This concept leverages surface micromachining technology that is used to fabricate the probe heads; therefore, this approach may potentially require the lowest incremental costs to add elevated electrodes to the head substrate. FIG. 19 is an illustration of elevated electrodes with curved beams. The elevated backplane with electrodes, the mechanical support, and signal interconnect may be fabricated of the same layers of material, including those used to fabricate the probe heads.

Figures 20, 21, 22:
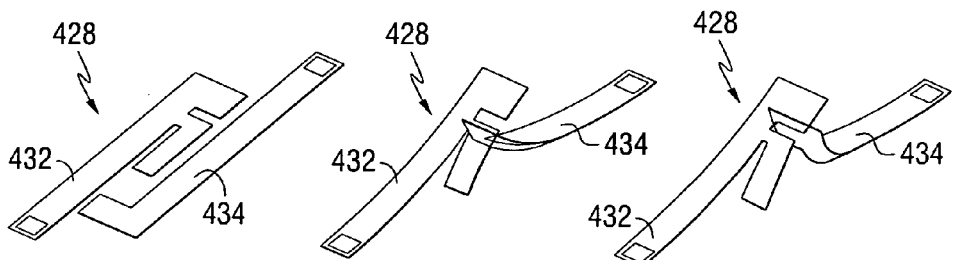
FIGS. 20 through 24 show elevated electrodes and a locking mechanism with non-overlapping structural layers.
Figures 23, 24:
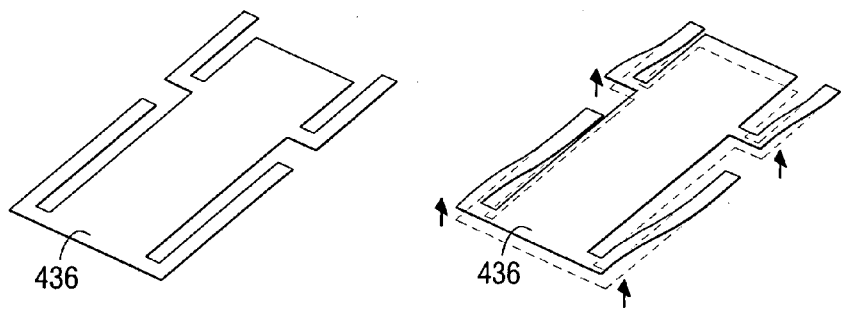

FIGS. 20 through 24 show an embodiment of the beams that includes a locking mechanism with non-overlapping structural layers. FIGS. 20-22 show an example of a stress beam 428 which may be used to support and lock structures out of the plane of the substrate. The beam includes components 432 and 434. In FIG. 20, the components are not released. In FIG. 21, the components are partially assembled. In FIG. 22, the components are locked. FIGS. 23-24 show an illustration of a plate 436 with a four-beam support configuration, which is lifted up due to the release of built-in stress on the beams. In FIG. 23, the plate is not released. In FIG. 24, the plate is released.

The layer material of the probe heads can be selected to form a composite structure with intrinsic stress so that the probe head would curve away from the substrate. The same material may be used to create curved beams that are interlocked together as shown in FIGS. 20-22. These beams may be connected to flat plates (made of low-stress material) patterned with metal electrodes to create elevated electrodes shown in FIGS. 23-24. These beams may also serve as electrical interconnections to the elevated electrodes. It is conceivable to choose the proper support beam length and width to achieve the proper elevation as well as parallelism against the substrate. The elevated plates could be immune to very high shock and vibration due to the light mass of these structures and the use of a locking mechanism.

FIGS. 25, 26, 27, 28 and 29 show plates for the elevated electrodes and a locking mechanism with overlapping structural layers. FIGS. 25-26 illustrate a plate 440 having a locking mechanism 442 that may be more conducive for self-assembly, but designs like these require two overlapping structural layers. Since the elevated plate must be made of a material or composite materials with low total stress (to achieve flatness), it is likely that a secondary overlapping structural layer will be required for this embodiment. Then the support beams may also be made with a single or two structural layers to fine-tune the stiffness and shape of the released beams. In FIGS. 25 and 26, the lifting and locking beams are located at the "outer" sides of the elevated plate.

FIGS. 27, 28 and 29 show an alternative locking mechanism using two structural layers. In this case, after released, the top structure goes through a hole in the bottom structure and latches onto the indentation on the edge of the hole. A hole 444 (or holes) may be created in the elevated plate 446 through which the lifting and locking beams 448 will extend, as shown in FIGS. 27, 28 and 29.

In FIGS. 27, 28 and 29, the locking beam is on top instead of underneath a lifted structure. The bottom structure is lifted from the substrate (by intrinsic stress or by other mechanisms). The locking beam also becomes raised and extends through a hole in the bottom structure. The locking beam eventually catches against the edge of the hole and locks both structures in place.

Figure 30D:
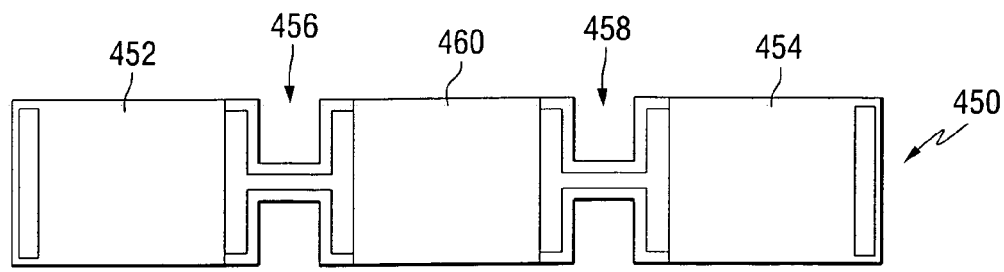
FIGS. 30a, 30b, 30c and 30d show elevated electrodes including curved lever materials, as well as leaf springs and a raised platform.
Figure 30C:
Figure 30B:
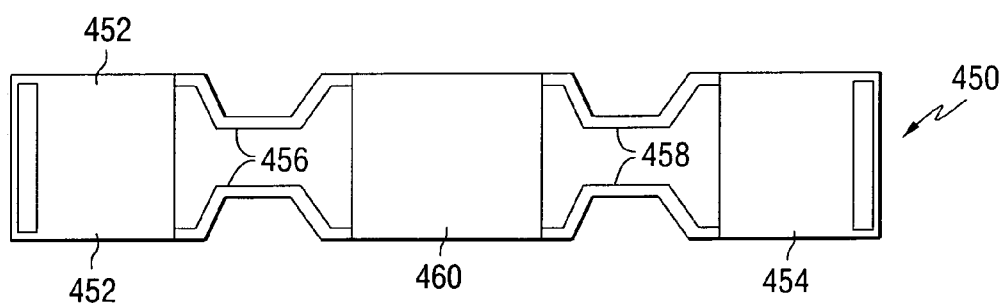
Figure 30A:
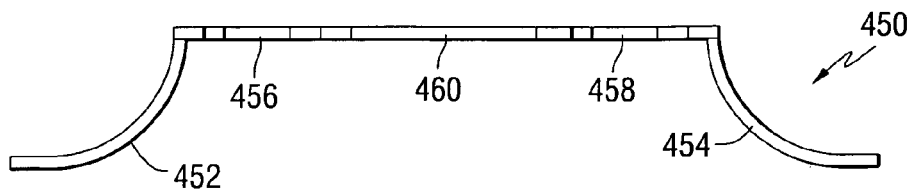

Another method of elevating the electrode platform is illustrated in FIGS. 30a, 30b and 30c. FIG. 30a is a side elevation view showing an elevated electrode structure 450 using the curvature of levers 452 and 454, as well as leaf springs 456 and 458 and a raised platform 460. These materials can be completely integrated with the processes of a probe storage device. FIG. 30b shows a top view of the structure after release. FIG. 30c shows a top view of the structure before release.

The electrode platform to be raised is attached to one or more compliant springs (such as leaf or serpentine springs), which are then supported by levers attached to the substrate. Upon release the levers curl away from the substrate, lifting the electrode platform. The springs and the levers will also serve as electrical interconnects to the elevated electrodes. The advantage of this scheme is that it requires no additional process steps; that is, all of the processing steps can be done as a part of the normal probe device fabrication. In particular, since the lever materials are not placed directly on top of each other, the released and curved structures do not have to be deposited twice. A method of locking this structure in place (not shown in FIG. 30) can be done similarly to that in FIGS. 20-25, requiring no overlapping structures, and therefore no extra processing steps.

The elevated electrodes described above are particularly appropriate when used with the rigid head-media spacing solution described below. If the rigid supports are used, the elevated electrodes could be built in the same processing step, such as by electroplating or by polymer (SU8) layering.

Rigid supports, such as standoff posts, can be used to define the head-media spacing passively. A minimum of three supports are required to define the offset plane. As a substrate-level solution, the MEMS supports may be created on either the head wafer or the media wafer. An illustration of this concept is shown in FIG. 31.

Figure 31:
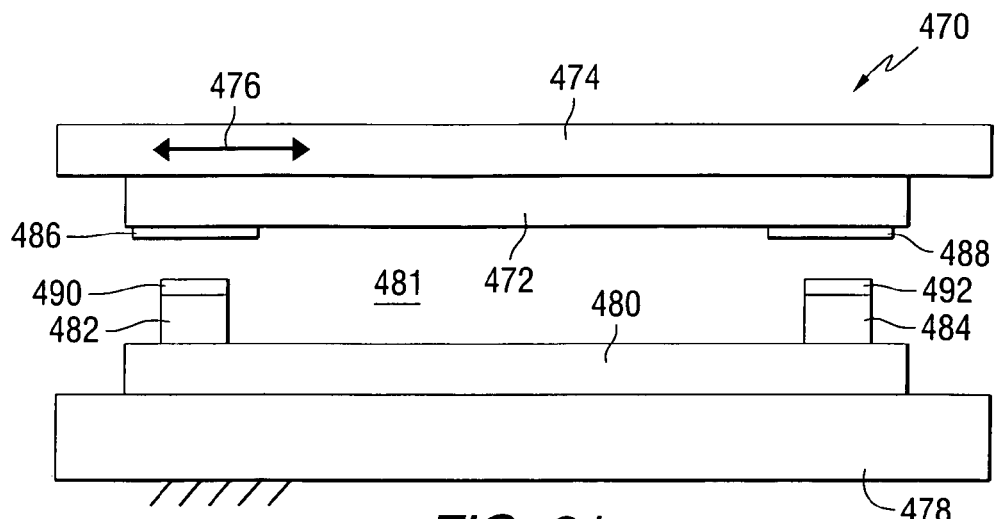
FIGS. 31 through 36 are schematic representations of alternative probe storage devices.
Figure 32:
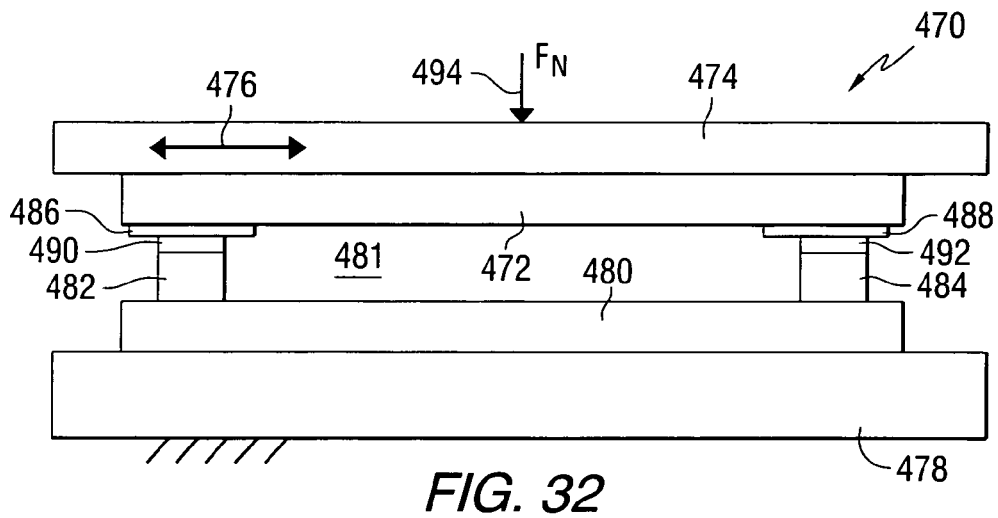

FIG. 31 is a schematic representation of a probe storage device 470. The device includes a storage media 472 mounted on a sled 474 that can move as shown by arrow 476 using actuators not shown in this view. The device package 478 supports a head having a head substrate 480 and a plurality of probes, not shown in this view. A gap 481 is formed between the head substrate and the media. Supports, in the form of standoff posts 482 and 484, are positioned in the gap and are used to define the head-media spacing. Layers 486, 488, 490 and 492 of low friction material are positioned on the media and the tops of the supports. In-plane motion is unrestrained due to a low friction interface. FIG. 32 shows that the wafers are held together with a normal force 494.

In FIGS. 31 and 32 MEMS supports are built on the head substrate. A low-friction/low-wear material is placed between the supports and the media wafer. A normal force is supplied to lower the media onto the supports and maintain contact in the face of operating and non-operating shock and vibration.

In one embodiment this normal force may be achieved through magnetic forces. The supports may be made of a magnetic material and attracted to the opposing wafer with a permanent magnet. In another embodiment, magnets on the media sled and the package provide the attractive force.

The supports provide a rigid connection, which passively defines head-media spacing. MEMS processing techniques allow the spacing to be defined very accurately. The rigid connection provides both operating and non-operating vibration and shock resistance. The passive normal force would also correct any static spacing offset due to manufacturing tolerances. Because of the rigid spacers, the amplitude of the force does not need to be precise. The use of magnetic material for force generation could be low cost, compact, and easily implemented.

The integrated approach (substrate-level embodiment) where the supporting posts are directly fabricated on the head substrate or the media, is expected to provide the most accurate gap spacing because the reference surfaces are the actual substrate surfaces. Wafer thickness variation and assembly tolerances will have no effect on the gap spacing.

In the substrate-level embodiments, all the post supports may be fabricated in batch, requiring no additional assembly. The same fabrication step that generates the posts can be used to lift the capacitive sensor electrodes off of the substrate to generate larger signals. Therefore, the invention simultaneously addresses the head-media spacing challenge as well as the position sensor SNR challenge.

On the other hand, the less precise package-level embodiment where the supporting posts are created on the sled and the package (by assembly or by injection mold or other combined methods) may still potentially offer adequate gap spacing accuracy depending on the servo and signal-to-noise requirements.

In all embodiments, the media is assumed to be attached to a moving sled and the head substrate is assumed to be fixed to the package. The invention described here would also apply to a configuration where the head substrate is mounted on a moving sled and the media is stationary.

FIGS. 31 and 32 show an embodiment where the supports are built onto the head substrate. Low-friction/low-wear material layers are used such that in-plane motion is not restrained when the media wafer contacts the supports. A normal force is required to maintain contact between the media wafer and the supports that is sufficient to counteract operating and non-operating shock and vibration forces.

In the embodiment of FIGS. 31 and 32, the support posts may be conveniently fabricated on the MEMS head substrate. Minimal additional processing steps are required to add low friction areas on the media substrates, against which the posts will glide.

Figure 33:
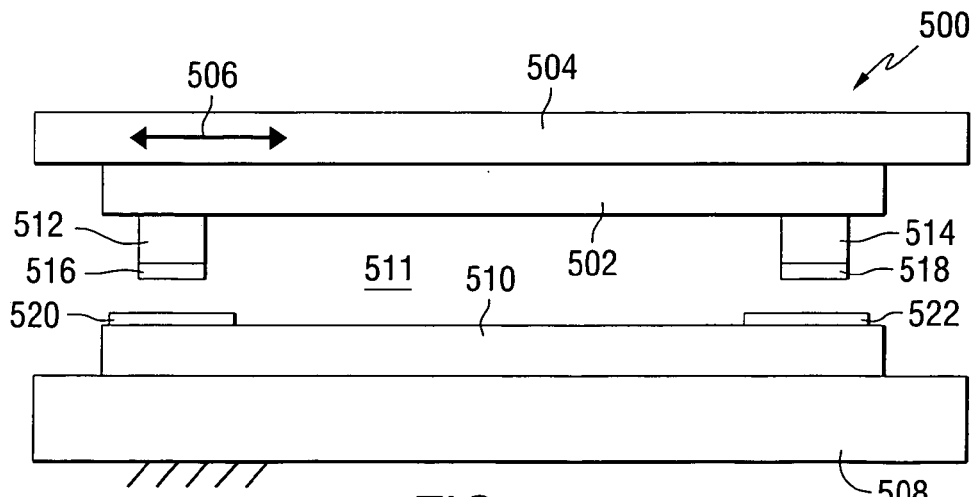

FIG. 33 is a schematic representation of a probe storage device 500. The device includes a storage media 502 mounted on a sled 504 that can move as shown by arrow 506 using actuators not shown in this view. The device package 508 supports a head having a head substrate 510 and a plurality of probes, not shown in this view. A gap 511 is formed between the head substrate and the media. Supports, in the form of standoff posts 512 and 514, are positioned in the gap and are used to define the head-media spacing. Layers 516, 518, 520 and 522 of low friction material are positioned on the media and the tops of the supports. In-plane motion is unrestrained due to a low friction interface. FIG. 33 shows an embodiment where the supports are built onto the media substrate.

Figure 34:
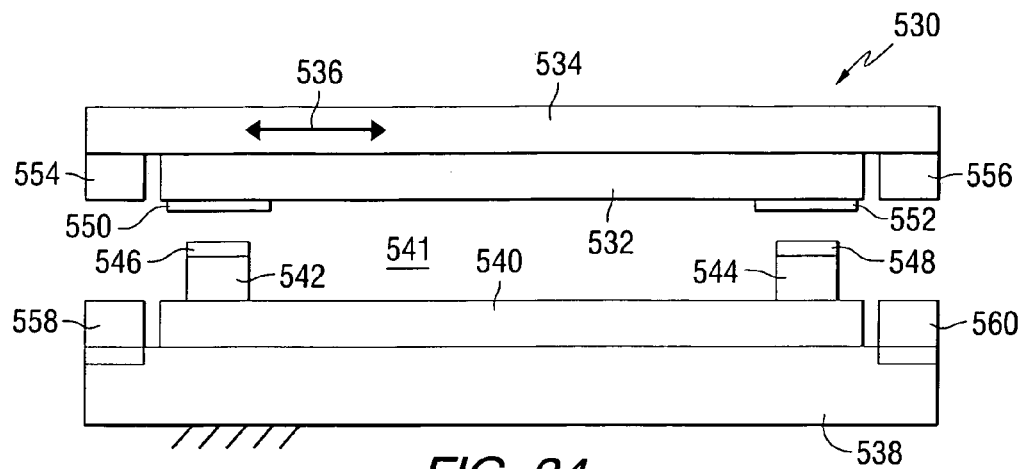

FIG. 34 is a schematic representation of a probe storage device 530. The device includes a storage media 532 mounted on a sled 534 that can move as shown by arrow 536 using actuators not shown in this view. The device package 538 supports a head having a head substrate 540 and a plurality of probes, not shown in this view. A gap 541 is formed between the head substrate and the media. Supports, in the form of standoff posts 542 and 544, are positioned in the gap and are used to define the head-media spacing. Layers 546, 548, 550 and 552 of low friction material are positioned on the media and the tops of the supports. In-plane motion is unrestrained due to a low friction interface. FIG. 34 shows an embodiment where the supports are built on the head substrate. A low-friction/low-wear interface is maintained between the head wafer and the supports. A normal force is required to maintain contact between the supports and the head wafer. In FIG. 34, permanent magnets 554, 556, 558 and 560 attached to the media sled and the package are used to provide the normal force.

In this case, the posts may be added to the media wafer after the intricate fabrication steps (such as sputtering or polishing) for the recording layer are completed. The media wafer is then diced into the appropriate substrate sizes.

Figure 35:
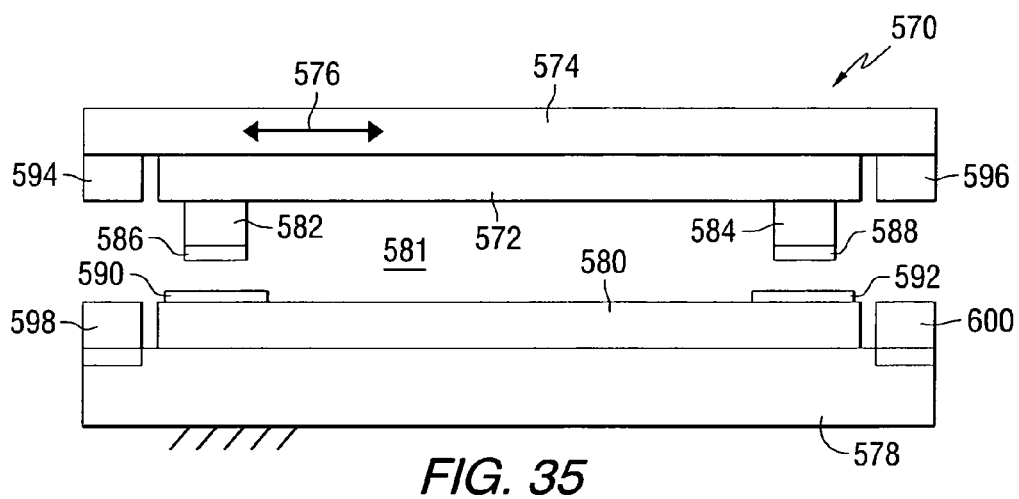

FIG. 35 is a schematic representation of a probe storage device 570. The device includes a storage media 572 mounted on a sled 574 that can move as shown by arrow 576 using actuators not shown in this view. The device package 578 supports a head having a head substrate 580 and a plurality of probes, not shown in this view. A gap 581 is formed between the head substrate and the media. Supports, in the form of standoff posts 582 and 584, are positioned in the gap and are used to define the head-media spacing. Layers 586, 588, 590 and 592 of low friction material are positioned on the media and the tops of the supports. In-plane motion is unrestrained due to a low friction interface. FIG. 34 shows an embodiment where the supports are built on the head substrate. A low-friction/low-wear interface is maintained between the head wafer and the supports. A normal force is required to maintain contact between the supports and the head wafer. In FIG. 34, permanent magnets 594, 596, 598 and 600 attached to the media sled and the package are used to provide the normal force.

In FIG. 35 MEMS supports are built on the head substrate. A low-friction/low-wear interface is maintained between the media wafer and the supports. Again, the normal force is generated via permanent magnets attached to the media sled and the package. Note that the figure is not to scale.

In FIG. 35, the magnets (or ferromagnetic material) attached to the moving sled should be very lightweight, in order to achieve high bandwidth actuator of the sled. The bulk of the magnet force may come from the magnets attached to the package, which have less mass or volume constraints.

Figure 36:
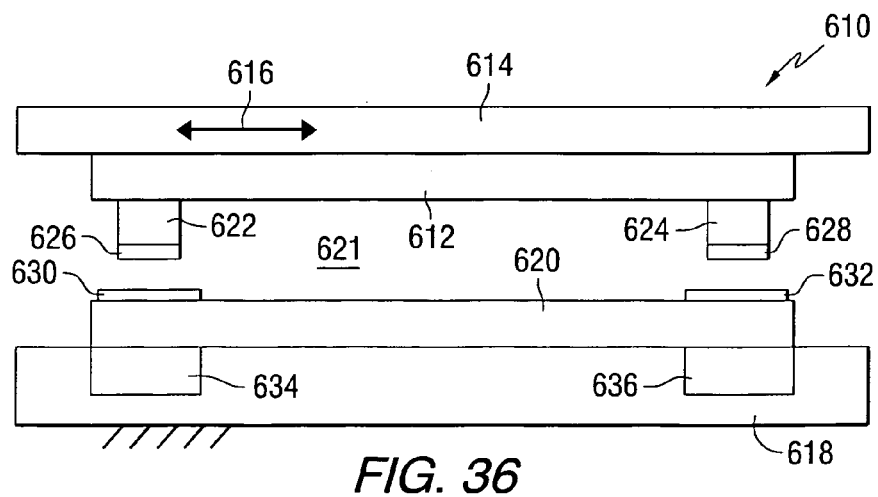

FIG. 36 is a schematic representation of a probe storage device 610. The device includes a storage media 612 mounted on a sled 614 that can move as shown by arrow 616 using actuators not shown in this view. The device package 618 supports a head having a head substrate 620 and a plurality of probes, not shown in this view. A gap 621 is formed between the head substrate and the media. Supports, in the form of standoff posts 622 and 624, are positioned in the gap and are used to define the head-media spacing. Layers 626, 628, 630 and 632 of low friction material are positioned on the media and the tops of the supports. In-plane motion is unrestrained due to a low friction interface. FIG. 36 shows an embodiment where the supports are built on the head substrate. A low-friction/low-wear interface is maintained between the head wafer and the supports. A normal force is required to maintain contact between the supports and the head wafer. In FIG. 36, permanent magnets 634 and 636 are attached to the package to provide the normal force.

In FIG. 36, the supports are built onto the media substrate and the normal force is generated via a permanent magnet embedded in the package. The post supports on the media substrate in this case are made out of a magnetic material that becomes attracted to the embedded magnet on the package. Additional magnets may be embedded in the media sled to increase the attractive force.

Figure 37A:
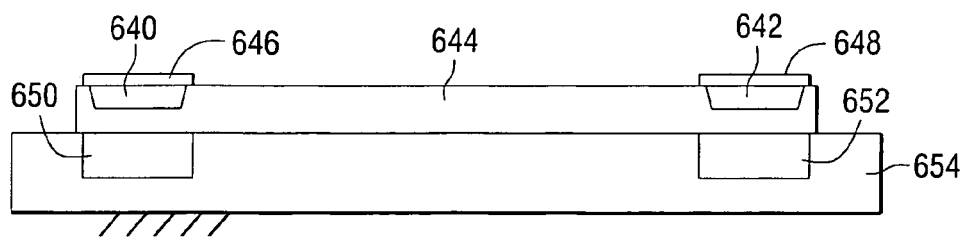
FIGS. 37a, 37b, 37c and 37d show alternative magnet mounting assemblies.

In an alternative embodiment, ferromagnetic material may be embedded inside either the media or head substrate to increase the magnet force. For example, if the head wafer is made of silicon, cavities on the head substrate may be created using anisotropic or isotropic etching techniques. The cavity may be created on the backside of the head substrate. FIGS. 37a, 37b, 37c and 37d show various examples of this construction. In FIG. 37a, magnetic material 640 and 642 is embedded in the head substrate 644 below a layer of low friction material 646 and 648. Additional magnetic material 650 and 652 is embedded in the package 654.

Figure 37B:
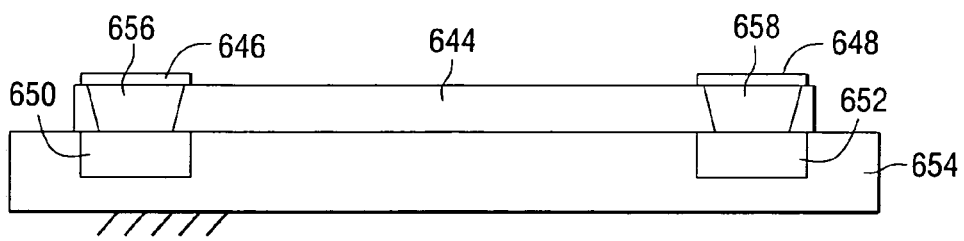
Figure 37C:
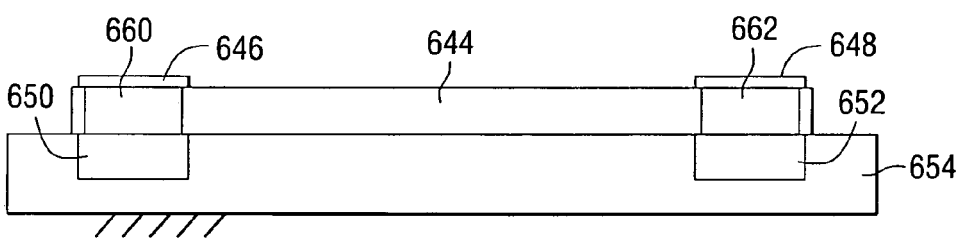
Figure 37D:
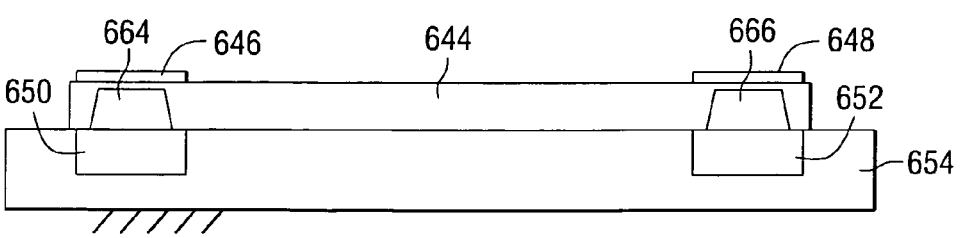

In FIGS. 37b and 37c, the magnetic material 656, 658, 660 and 662 is embedded in deeper cavities. FIG. 37d shows that the magnet 664 and 666 may protrude from the package into the head substrate, reducing its distance from the mating post. The magnet in this case may also serve as an alignment feature for head substrate and package assembly.

Figure 38:
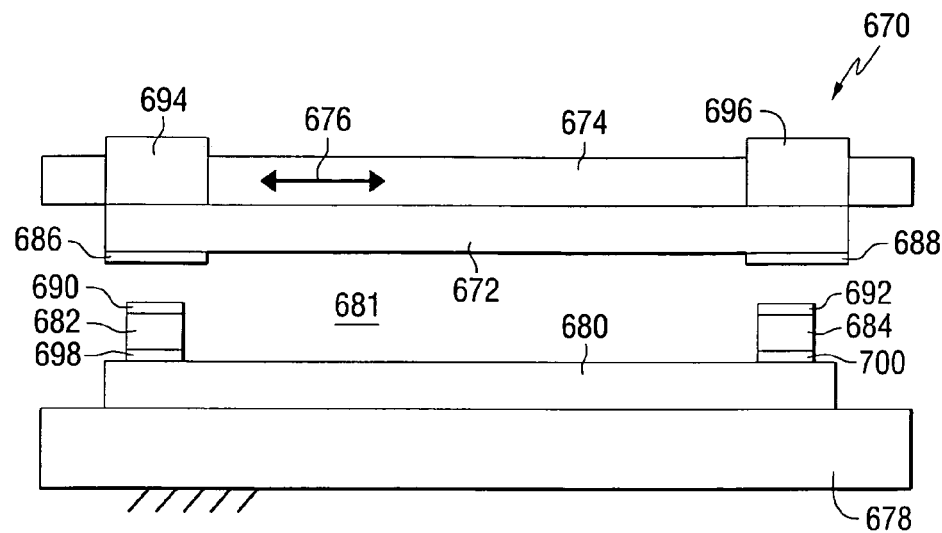
FIG. 38 is a schematic representation of a probe storage device.

In another embodiment the supports are built onto the head substrate and the normal force is generated via a permanent magnet embedded in the media sled. FIG. 38 is a schematic representation of a probe storage device 670. The device includes a storage media 672 mounted on a sled 674 that can move as shown by arrow 676 using actuators not shown in this view. The device package 678 supports a head having a head substrate 680 and a plurality of probes, not shown in this view. A gap 681 is formed between the head substrate and the media. Supports, in the form of standoff posts 682 and 684, are positioned in the gap and are used to define the head-media spacing. Layers 686, 688, 690 and 692 of low friction material are positioned on the media and the tops of the supports. In-plane motion is unrestrained due to a low friction interface. FIG. 38 shows an embodiment where the supports are built on the head substrate. A low-friction/low-wear interface is maintained between the head wafer and the supports. A normal force is required to maintain contact between the supports and the head wafer. In FIG. 38, permanent magnets 694 and 696 are attached to the sled to provide the normal force.

The supports are made out of a magnetic material and become attracted to the embedded magnet. The normal force is generated via the interaction between a permanent magnet embedded into the media sled and the supports themselves.

The supports are made out of a magnetic material. Additional magnets may be embedded in the package to increase the attractive force (not shown).

A damping material 698 and 700 can be placed between the supports and the head substrate to reduce high frequency vibration. The damping material in this configuration, which could be a polymer, must be very stiff to obtain rigid spacing. The order of the layer stack of the posts may depend on the ease of fabrication.

Figure 39:
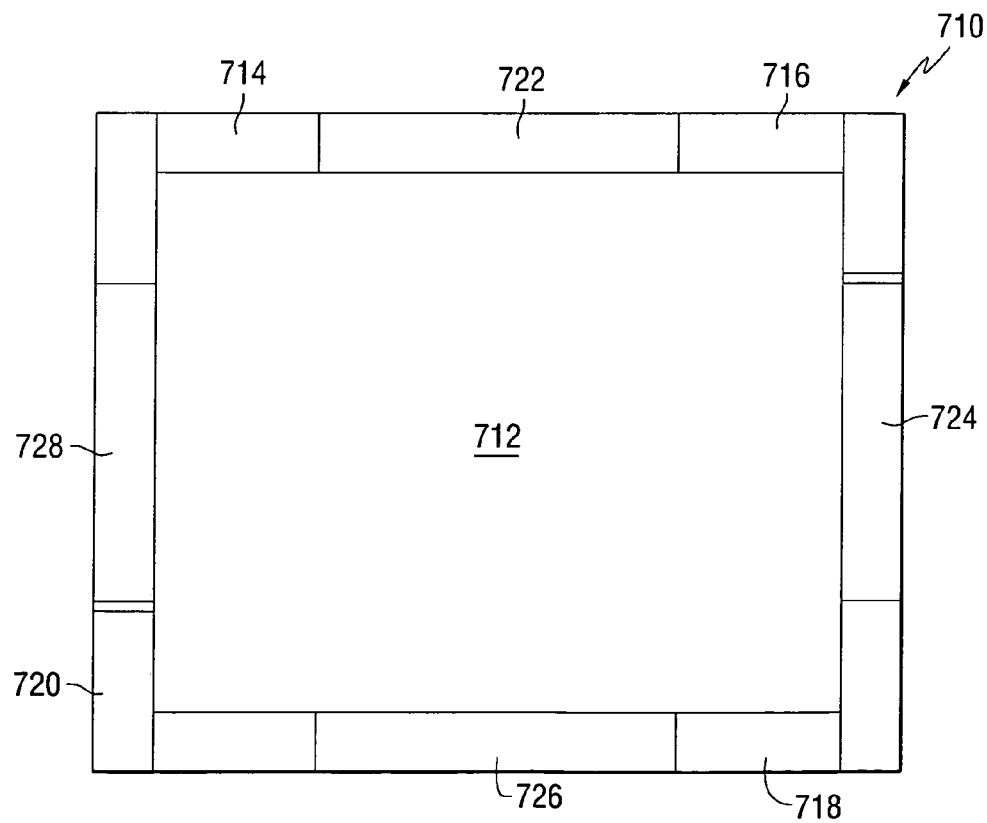
FIG. 39 is a plan view of a head substrate and associated posts and sensors.

FIG. 39 is a plan view of a head wafer layout 710. The wafer 712 is expanded by 1 mm in each direction to accommodate the support structure, which comprises magnetic posts 714, 716, 718 and 720. Capacitive sensors 722, 724, 726 and 728 are built on the support extension in areas in which the support is not needed.

The posts are located along the border of the head (or media) wafer. This border of the head (or media) wafer, which may be prohibited to be used for data, may be used to accommodate not only the magnets and posts, but also position sensors. In order to maximize the SNR of the sensors, the capacitive sensor electrodes may be built on the top of some post structures so that the gaps between the electrodes on the head and media wafers are equal or smaller than the desired head-media spacing. These sensor posts could be fabricated simultaneously with the mechanical standoff posts. As a result, it is possible to trade-off the amount of wafer extension vs. the post length and capacitive sensor area.

Figure 40:
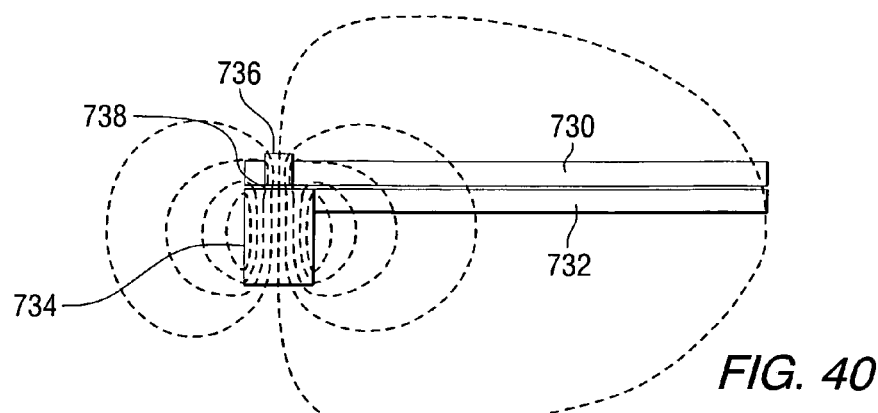
FIG. 40 is a schematic representation of a portion of a probe storage device showing a magnetic field produced in a simulation.

In one design example, it is desired that the holding force be greater than 0.4 N, which is the force required to resist 200 G acceleration with 200 mg mass. It is assumed that non-operating shock will be handled with separate bumpers. FIG. 40 shows the geometry used in this example. Magnets (NdFe35) are embedded in both the package and the media sled and through the media and head wafers. The post is constructed of iron. The head and media wafers are modeled as silicon. The width of the post and the width of the magnet are 200 μm and 500 μm respectively. The height of the magnet is 800 μm, allowing the magnet to fit inside the package.

Item 730 represents the media wafer and item 732 represents the head wafer. Item 734 represents a magnet embedded in the package that extends through the head wafer. Item 736 represents a magnet embedded in the media sled that extends through the media wafer. Item 738 represents the iron post built onto the head wafer.

For this geometry/material combination a holding force of 80 N/m is generated. Therefore, to achieve 0.4 N of force the post must be 5 mm deep. A potential layout is shown in FIG. 39. The head wafer is extended by 1 mm in each direction. Posts are built around the extended corners with a combined length of 5 mm. An example is to put a post (and four magnets) at each of the four corners of the rectangular substrates.

The post interface surfaces may be covered with low friction coating such as Teflon (coefficient of friction of 0.05 to 0.2) or DLC (diamond-like carbon) coating (coefficient of friction of 0.05 to 0.15, or as low as 0.003-0.008 at low sliding speed). The lowest achievable coefficient of friction will depend on the final choice of lubrication, scan and seek speed, and packaging environment.

Given a total normal force of 0.4 N, and assuming a post coefficient of friction of 0.03, then the drag force parallel to the plane of the sled due to the post contact surfaces will be 12 mN. While 12 mN is not negligible and will reduce the efficiency of the sled actuator, the significant benefits of the posts (elimination of the need for vertical and tilt sensing, control, and actuation and constant head-media spacing) are a worthy trade-off.

Figure 41:
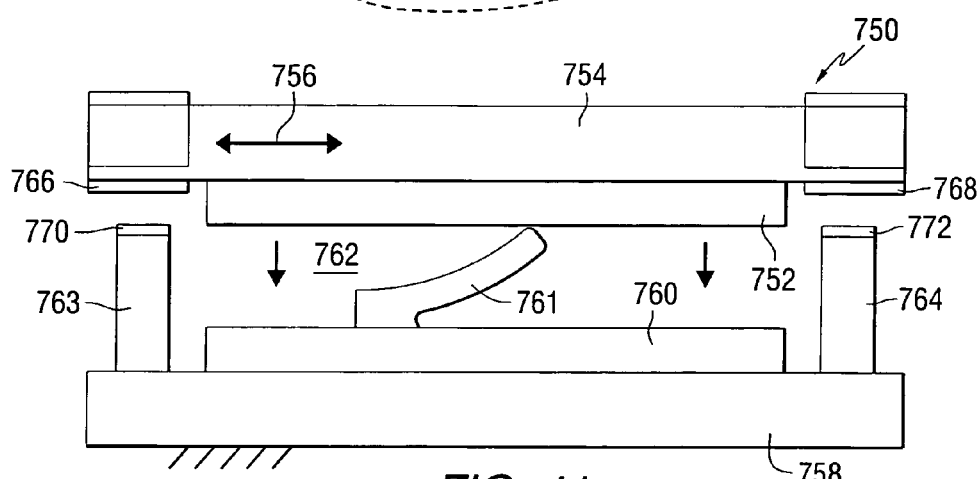
FIGS. 41 through 43 are schematic representations of alternative probe storage devices.

FIG. 41 is a schematic representation of a probe storage device 750. The device includes a storage media 752 mounted on a sled 754 that can move as shown by arrow 756 using actuators not shown in this view. The device package 758 supports a head having a head substrate 760 and a plurality of probes, for example probe 761. A gap 762 is formed between the head substrate and the media. Supports, in the form of standoff posts 763 and 764, are positioned in the gap and are used to define the head-media spacing. Layers 766, 768, 770 and 772 of low friction material are positioned on the media and the tops of the supports. In-plane motion is unrestrained due to a low friction interface. FIG. 41 shows an embodiment where the supports are built onto the package.

In the embodiment of FIG. 41, the support posts are located on the package while magnets are embedded in the sled, with low-friction/low-wear contact surfaces between the post and the sled. While this package-level embodiment may not achieve the same accuracy (parallelism and spacing) as the substrate-level embodiment, it is still a viable solution, since it offers flexibility in terms of size and material choices of the rigid posts, which do not have to be compatible with the head substrate. Furthermore, the full real estate of the media may now be dedicated to data recording.

Figure 42:
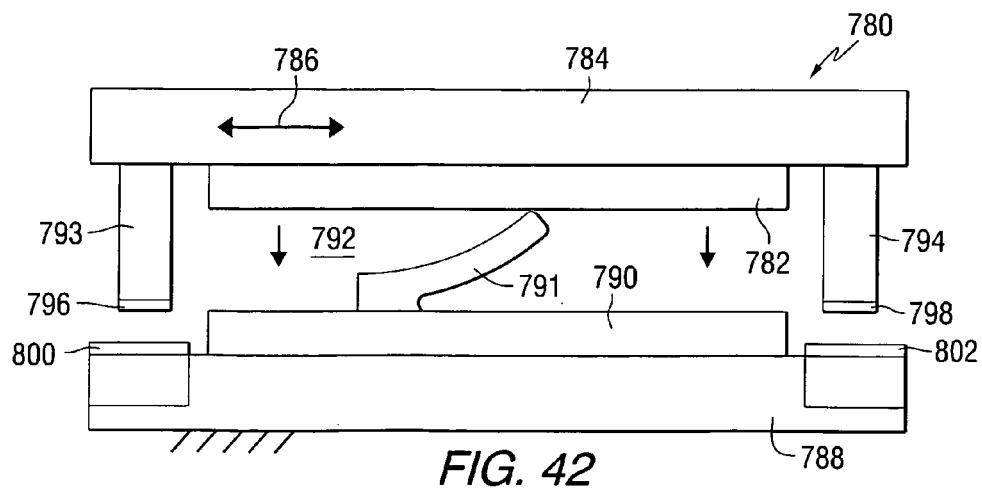

FIG. 42 is a schematic representation of a probe storage device 780. The device includes a storage media 782 mounted on a sled 784 that can move as shown by arrow 786 using actuators not shown in this view. The device package 788 supports a head having a head substrate 790 and a plurality of probes, for example probe 791. A gap 792 is formed between the head substrate and the media. Supports, in the form of standoff posts 793 and 794, are positioned in the gap and are used to define the head-media spacing. Layers 796, 798, 800 and 802 of low friction material are positioned on the media and the tops of the supports. In-plane motion is unrestrained due to a low friction interface. FIG. 42 shows an embodiment where the supports are built onto the sled.

In the embodiment of FIG. 42, the support posts are located on the sled while magnets are embedded in the bottom package to which the head substrate is attached, with low-friction/low-wear contact surfaces between the post and the sled. The main benefit of this approach is that if wearing occurs on the sliding surfaces and substantial particles are generated due to the choice of sliding surfaces, these particles may easily be contained by defining surrounding hubs around the post or by creating adhesive traps near the posts since there is ample free space between the sled and the top package. There is also less constraint on the size and location of the posts and magnets.

Figure 43:
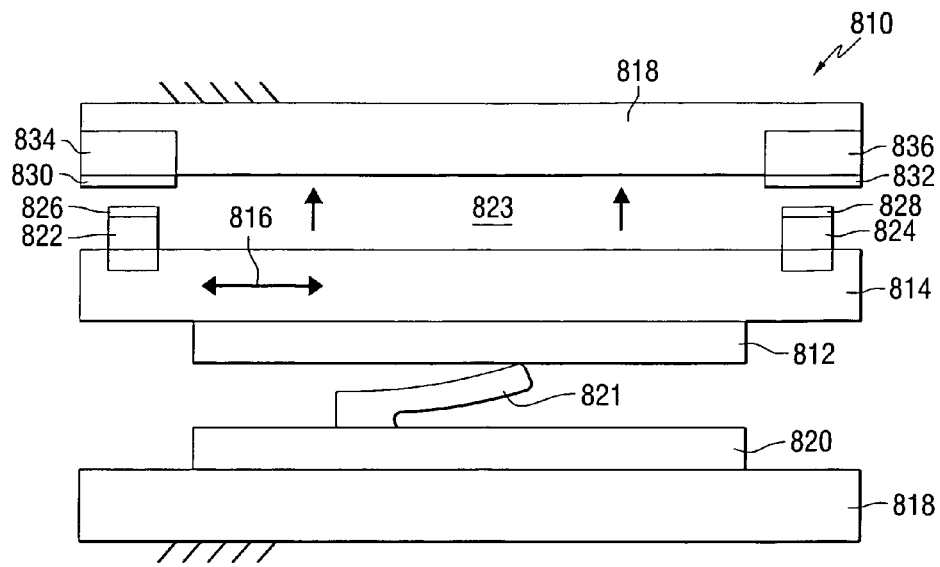

FIG. 43 is a schematic representation of a probe storage device 810. The device includes a storage media 812 mounted on a sled 814 that can move as shown by arrow 816 using actuators not shown in this view. The device package 818 supports a head having a head substrate 820 and a plurality of probes, for example probe 821. In this example, the package 818 forms a gap 823 with the sled. Supports, in the form of standoff posts 822 and 824, are positioned in the gap and are used to define the head-media spacing. Layers 826, 828, 830 and 832 of low friction material are positioned on the media and the tops of the supports. Magnets 834 and 836 are embedded in the package. In-plane motion is unrestrained due to a low friction interface. FIG. 43 shows an embodiment where the supports are built onto the sled.

In order to achieve precise gap spacing between the electrodes on the media and the head substrate, the elevated electrode concepts described above may be combined with active and passive gap control mechanisms. An illustration of the elevated electrode concept implemented in combination with gliding posts and magnet for passive z-spacing control is shown in FIG. 44.

Figure 44:
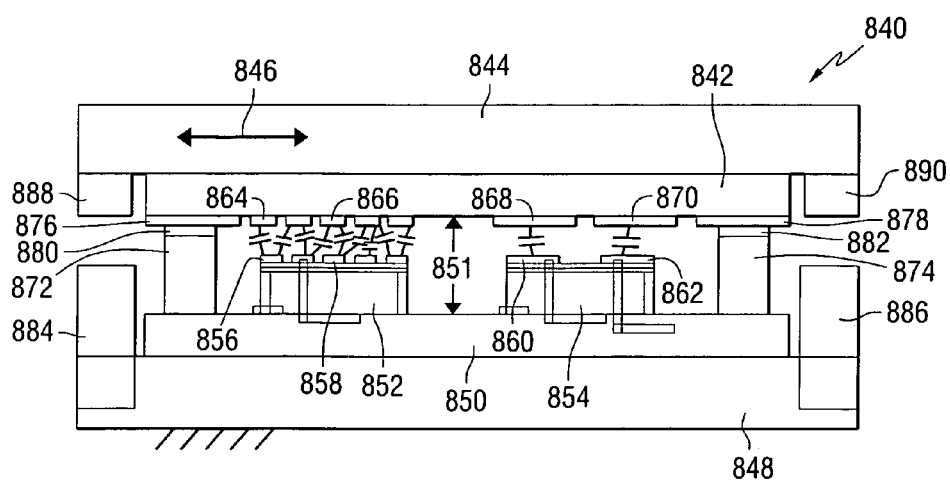
FIG. 44 is a schematic representation of a probe storage device including elevated electrodes in combination with gliding posts and magnet to achieve precise gap control.

FIG. 44 is a schematic representation of a probe storage device 840. The device includes a storage media 842 mounted on a sled 844 that can move as shown by arrow 846 using actuators not shown in this view. The device package 848 supports a head having a head substrate 850 and a plurality of probes, not shown in this view. A gap 851 is formed between the head substrate and the media. A plurality of supports 852 and 854 are positioned in the gap. Layers, for example 856, 858, 860 and 862, of low friction material are positioned on the media and the tops of the supports. In-plane motion is unrestrained due to a low friction interface. Electrodes mounted on the posts 852 and 854 form capacitors with electrodes mounted (for example 864, 866, 868 and 870) on the media. Standoff posts 872 and 874 in combination with low friction layers 876, 878, 880 and 882, define the head to media spacing. Magnets 884, 886, 888 and 890 are used to provide the normal force. Elevated electrodes are implemented in combination with gliding posts and magnet to achieve precise gap control.

While the invention has been described in terms of several embodiments, it will be apparent to those skilled in the art that various changes can be made to the described embodiments without departing from the scope of the invention as set forth in the following claims.

What is claimed is:

1. An apparatus comprising:
   a storage medium;
   a head substrate, wherein the storage medium and the head substrate are separated by a gap;
   a plurality of electrodes separated from each other; and
   a support structure comprising a plurality of non-conductive posts positioned in the gap for supporting some of the electrodes, each post comprising at least one conductor electrically connected to at least one of the plurality of electrodes supported by the post.

2. The apparatus of claim 1, wherein the posts are mounted on the head substrate.

3. The apparatus of claim 1, wherein the posts are mounted on the storage medium.

4. The apparatus of claim 1, further comprising:
   a shield on each of the posts.

5. An apparatus comprising:
   a storage medium;
   a head substrate, wherein the storage medium and the head substrate are separated by a gap;
   a plurality of electrodes separated from each other; and
   a support structure positioned in the gap for supporting some of the electrodes, wherein the support structure comprises:
   a locking lever assembly.

6. An apparatus comprising:
   a storage medium;
   a head substrate, wherein the storage medium and the head substrate are separated by a gap;
   a plurality of electrodes separated from each other; and
   a support structure comprising a lever and a leaf spring, and being positioned in the gap for supporting some of the electrodes.

7. An apparatus comprising:
   a sled;
   a storage medium mounted on the sled;
   a head substrate, wherein the storage medium and the head substrate are separated by a gap;
   a first plurality of magnets connected to the sled;
   a second plurality of magnets connected to the substrate, wherein the first and second plurality of magnets apply a force urging the head substrate toward the storage medium;
   a plurality of posts positioned in the gap; and
   a layer of low friction material positioned on one end of each of the posts.

8. The apparatus of claim 7, wherein the posts are mounted on the head substrate.

9. The apparatus of claim 7, wherein magnets in the first plurality of magnets are positioned at opposite ends of the sled.

10. The apparatus of claim 7, further comprising:
    a plurality of electrodes separated from each other to form sensor capacitors; and
    a support structure positioned in the gap for supporting some of the electrodes.

11. The apparatus of claim 10, wherein the support structure is mounted on the head substrate.

12. The apparatus of claim 10, wherein the support structure is mounted on the storage medium.

13. The apparatus of claim 10, wherein the support structure comprises:
    a non-conductive post; and
    a conductor electrically connected to one of the electrodes.

14. The apparatus of claim 13, further comprising:
    a shield on the post.

15. The apparatus of claim 10, wherein the support structure comprises:
    an electrically conductive post.

16. The apparatus of claim 10, wherein the support structure comprises:
    a locking lever assembly.

17. The apparatus of claim 10, wherein the support structure comprises:
    a lever and a leaf spring.

18. An apparatus comprising:
    a sled;
    a storage medium mounted on the sled;
    a head substrate, wherein the storage medium and the head substrate are separated by a gap;
    a first plurality of magnets connected to the sled;
    a second plurality of magnets connected to the substrate, wherein the first and second plurality of magnets apply a force urging the head substrate toward the storage medium; and
    a plurality of electrodes separated from each other to form sensor capacitors, wherein some of the electrodes extend into the gap to increase the capacitance between the electrodes.

* * * * *